(12) United States Patent
Appel et al.

(10) Patent No.: US 11,609,417 B2
(45) Date of Patent: Mar. 21, 2023

(54) SINGLE ACTUATION GOGGLE POSITIONING MOUNTING ASSEMBLY

(71) Applicant: Elbit Systems of America, LLC, Fort Worth, TX (US)

(72) Inventors: Victor Appel, Lynchburg, VA (US); John F. Kasper, Farmington, NY (US); David Alan Vogler, Rochester, NY (US); Keith D. Damick, Ontario, NY (US)

(73) Assignee: Elbit Systems of America, LLC, Fort Worth, TX (US)

( * ) Notice: Subject to any disclaimer, the term of this patent is extended or adjusted under 35 U.S.C. 154(b) by 0 days.

(21) Appl. No.: 17/690,827

(22) Filed: Mar. 9, 2022

(65) Prior Publication Data

US 2022/0197005 A1 Jun. 23, 2022

Related U.S. Application Data

(62) Division of application No. 16/450,596, filed on Jun. 24, 2019, now Pat. No. 11,327,291.

(51) Int. Cl.
*A42B 3/04* (2006.01)
*G02B 23/12* (2006.01)
*F16M 13/04* (2006.01)

(52) U.S. Cl.
CPC ............ *G02B 23/125* (2013.01); *A42B 3/042* (2013.01); *A42B 3/0406* (2013.01); *F16M 13/04* (2013.01)

(58) Field of Classification Search
CPC ..... A42B 3/0406; A42B 3/042; A42B 3/0433; A42B 3/30; A42B 3/303; A42B 3/306; A42B 3/04; A42B 3/0426; A42B 3/044; A42B 3/0446; A42B 3/222; A42B 3/223; A42B 1/24; A42B 1/242; A42B 1/244; A42B 1/245; A42B 3/185; G02B 23/125; G02B 23/16; G02B 7/002; G02B 7/02; G02B 23/18; F16M 13/04; F16M 13/02; F16M 13/022; F16B 21/10; F16B 21/12; Y10T 403/29; Y10T 403/293; Y10T 403/295; Y10T 403/32024;
(Continued)

(56) References Cited

U.S. PATENT DOCUMENTS 4,449,787 A * 5/1984 Burbo ................ G02B 27/0176
359/410
5,857,599 A * 1/1999 Palmer ................ G02B 23/125
359/815

(Continued)

*Primary Examiner* — Amy Vanatta
(74) *Attorney, Agent, or Firm* — K&L Gates LLP

(57) ABSTRACT

A mounting device having a mounting assembly for mounting a pair of goggles to a helmet is provided. The mounting assembly is configured to provide at least three degrees of freedom of movement using one or more actuation mechanisms for locking and unlocking a position of the mounting device. The number of actuation mechanisms is less than a number of degrees of freedom. In some aspects, the number of actuation mechanisms is one. A rotation base connects the mounting assembly to the helmet, and a goggle linkage connects the mounting assembly to the goggles. Various single actuation mechanisms, including a sliding mechanism, a friction-based wire/brake mechanism, and a floating friction brake mechanism, are provided.

18 Claims, 17 Drawing Sheets

(58) Field of Classification Search
CPC ........... Y10T 403/32827; Y10T 403/59; Y10T 403/591; Y10T 403/599; Y10T 403/60
USPC ....... 2/422; 248/205.1, 274.1, 288.11, 276.1, 248/682, 389
See application file for complete search history.

(56) References Cited

U.S. PATENT DOCUMENTS

| | | | |
|---|---|---|---|
| 6,457,179 B1* | 10/2002 | Prendergast | A42B 3/042 2/6.2 |
| 7,444,683 B2* | 11/2008 | Prendergast | G02B 23/125 2/6.2 |
| 7,735,159 B2* | 6/2010 | Prendergast | G02B 27/0176 2/422 |
| 7,810,168 B2* | 10/2010 | Reed | G02B 27/0176 2/6.2 |
| 8,209,780 B1* | 7/2012 | Lemire | A42B 3/04 2/6.6 |
| 9,781,963 B1* | 10/2017 | Celona | A42B 3/223 |
| 2008/0184462 A1* | 8/2008 | Prendergast | A42B 3/04 2/410 |
| 2009/0268288 A1* | 10/2009 | Prendergast | G02B 23/125 359/480 |
| 2010/0299814 A1* | 12/2010 | Celona | A42B 3/04 2/422 |
| 2011/0127305 A1* | 6/2011 | Yates | G02B 27/0176 224/181 |
| 2011/0145981 A1* | 6/2011 | Teetzel | G02B 23/125 2/422 |
| 2011/0239354 A1* | 10/2011 | Celona | A42B 3/04 2/422 |
| 2013/0083391 A1* | 4/2013 | Teetzel | G02B 23/18 359/409 |
| 2014/0084120 A1* | 3/2014 | Solinsky | A42B 3/04 248/227.1 |
| 2017/0184835 A1* | 6/2017 | Teetzel | G02B 27/0149 |
| 2021/0164610 A1* | 6/2021 | Roth | A45F 5/02 |

* cited by examiner

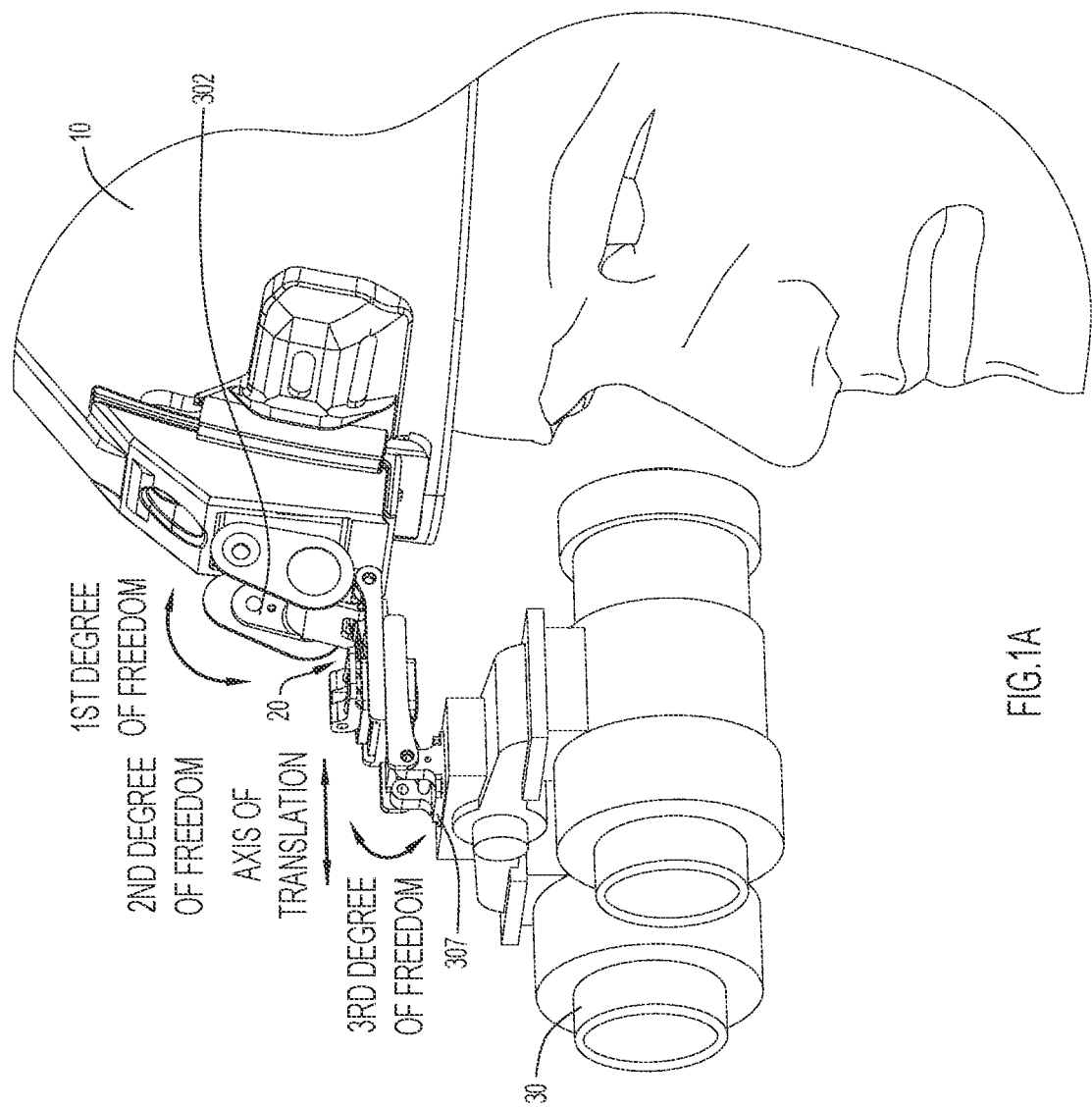

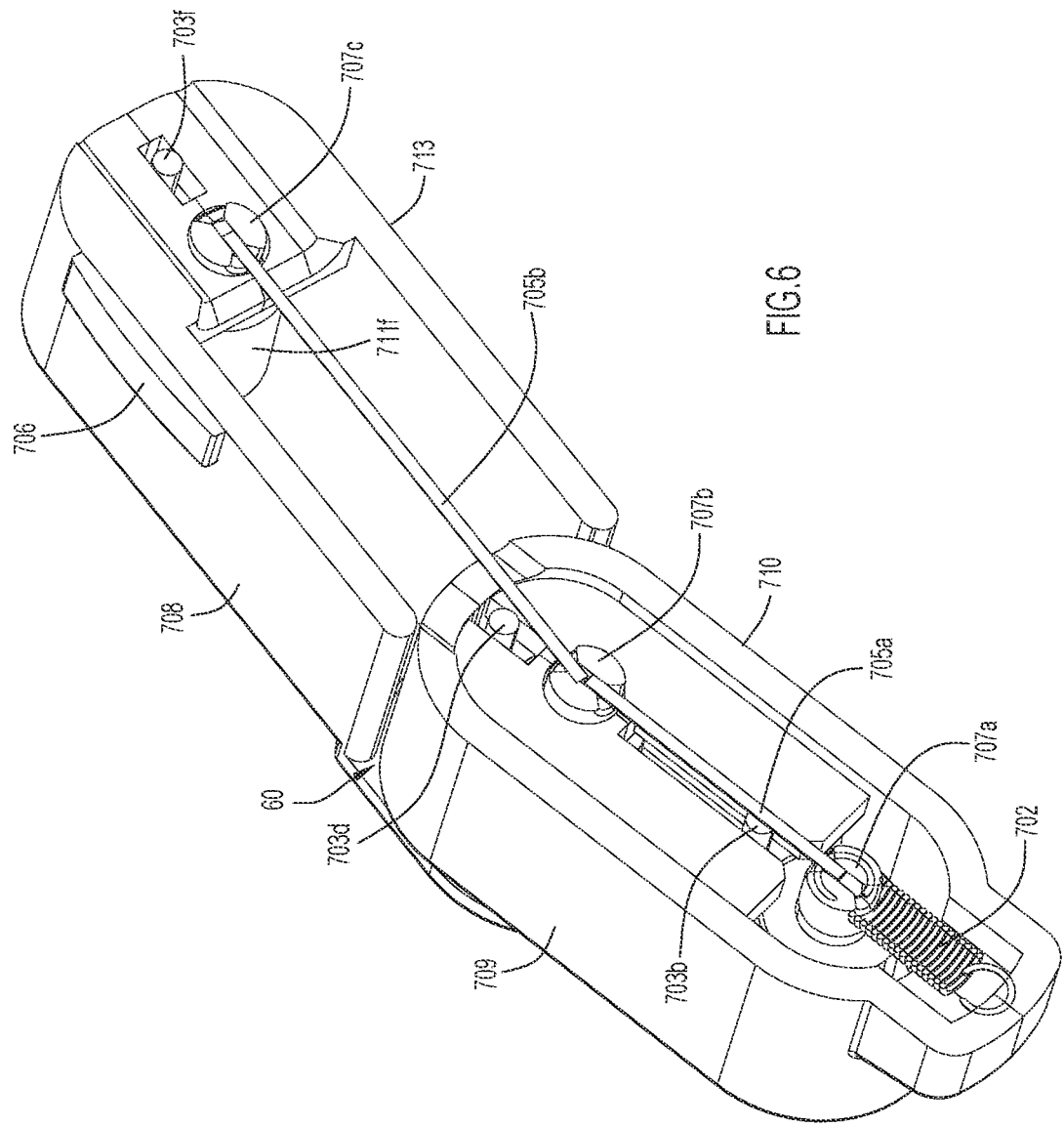

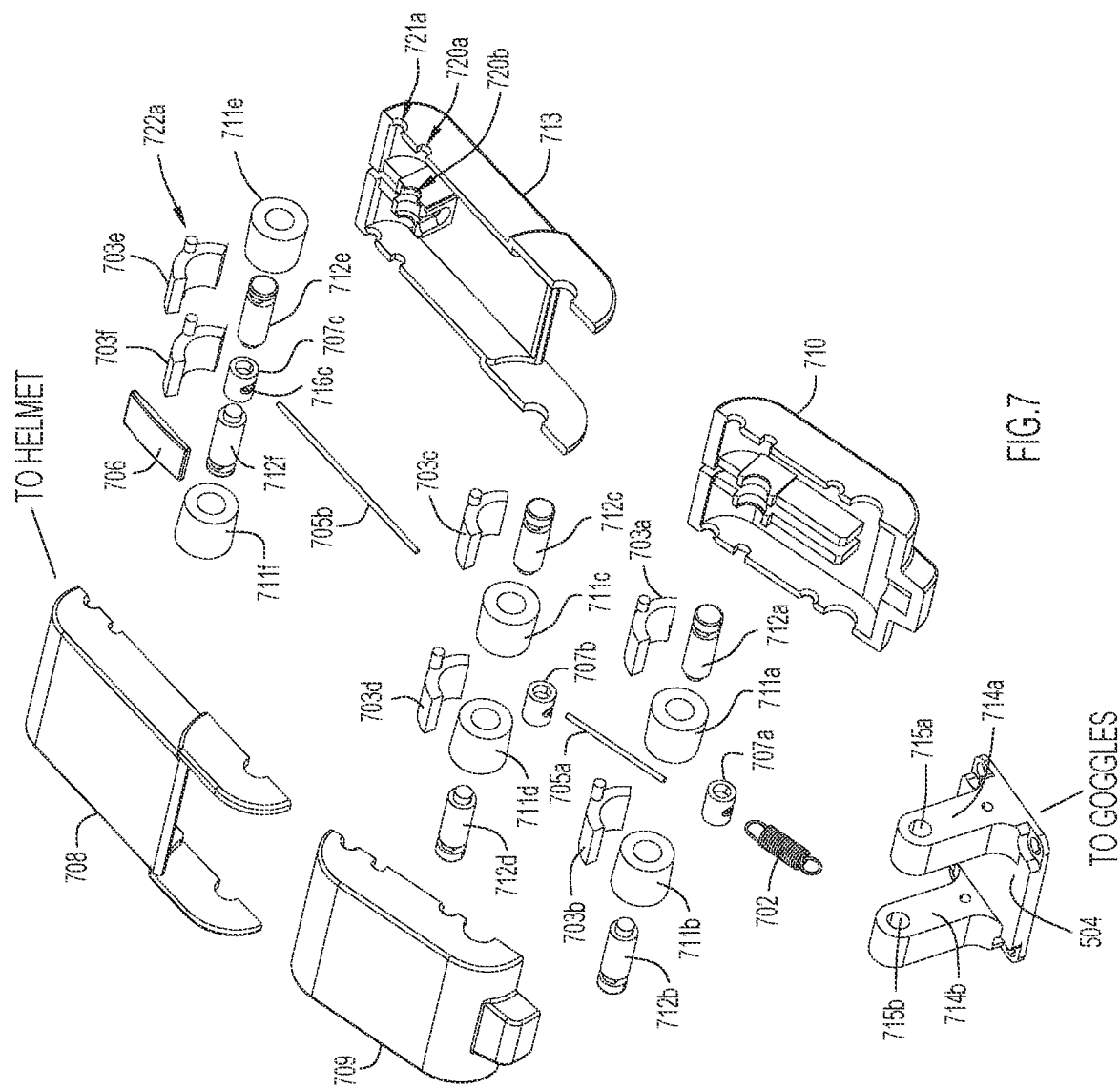

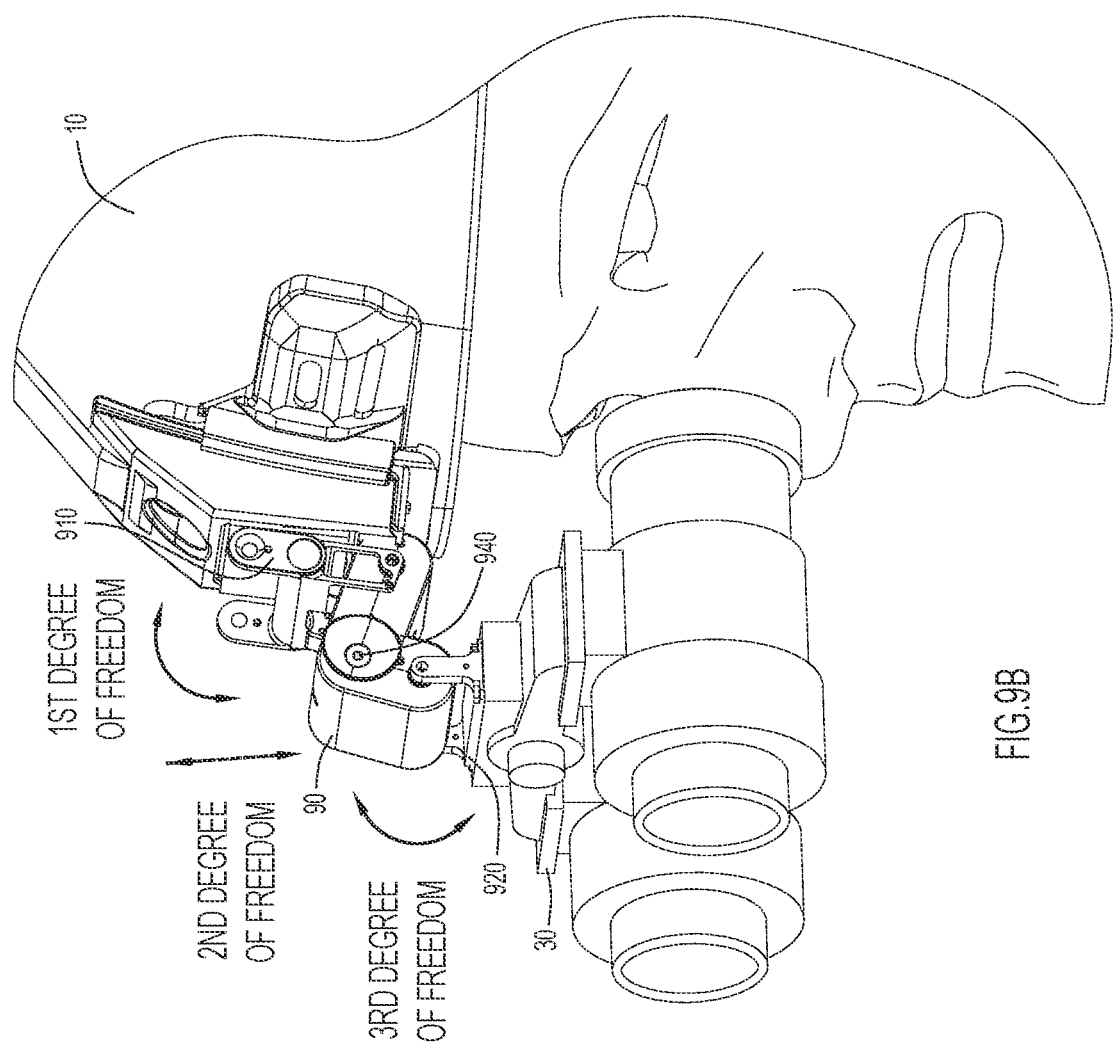

SINGLE ACTUATION GOGGLE POSITIONING MOUNTING ASSEMBLY

PRIORITY CLAIM AND CROSS-REFERENCE TO RELATED APPLICATIONS

The present application is a divisional of and claims priority to pending U.S. patent application Ser. No. 16/450,596, filed Jun. 24, 2019, titled SINGLE ACTUATION GOGGLE POSITIONING MOUNTING ASSEMBLY, the entire contents of which are hereby incorporated by reference herein and relied upon.

FIELD OF THE INVENTION

The present techniques relate to a mounting assembly for goggle positioning, and in particular, to a single actuation mounting assembly configured to allow head-mounted goggles to move in three independent directions using a single actuation mechanism.

BACKGROUND OF THE INVENTION

Conventional goggle assemblies enable goggles to be mounted on a helmet or the like in such a manner that the goggles can be moved rotationally and translationally to properly position the goggles during use and when stowed. Such goggle assemblies include multiple adjustment mechanisms, typically having one adjustment mechanism for each degree of freedom of movement and with each mechanism independently manipulated by a user. For example, fore/aft movement may be controlled by a first positioning assembly and vertical adjust may be controlled by a second positioning assembly. This complexity not only increases training and setup time but also increases adjustment time in the field. Further, multiple adjustment mechanisms increase the overall weight of the wearable device.

Conventional goggle assemblies are typically manufactured as a separate device that is not integrated into the goggle or helmet. This type of configuration can lead to further delay in training and setup time.

Accordingly, a need exists for a simpler, more efficient goggle positioning assembly that reduces training and setup time as well as adjustment time in the field.

SUMMARY OF THE INVENTION

According to an embodiment, a single actuation goggle positioning mounting assembly configured to allow the goggles to move in three independent directions using a single actuation mechanism is provided. In some aspects, the single actuation goggle mounting positioning assembly is integrated with a pair of goggles via a goggle linkage. In other aspects, the single actuation goggle mounting positioning assembly is integrated into a helmet via a rotation base. In other aspects, the single actuation goggle mounting positioning assembly is integrated into both a helmet and goggles, via a rotation base and a goggle linkage.

In further aspects, the mounting assembly comprises one or more actuation mechanisms for locking and unlocking the position of the goggles, wherein a number of actuation mechanisms is less than a number of degrees of freedom. In an exemplary embodiment, the mounting assembly comprises a single actuation mechanism, wherein the single actuation mechanism is configured to provide three degrees of freedom of movement of the goggles when actuated. In some aspects, the single actuation mechanism may comprise a center lock (e.g., a cam-based locking component, a threaded screw-type lock, etc.), a movable switch/knob, or depressable button, etc.

According to an embodiment, the goggle positioning mounting assembly includes a sliding mechanism with a plurality of sliding elements. When the single actuation mechanism is actuated, the goggles may undergo movement in three directions, namely, up/down, fore/aft, and tilt, as the plurality of sliding elements undergo movement. For fore/aft movement, the length of the sliding mechanism may increase and decrease as the goggles translocate between the fore and aft positions.

According to another embodiment, the goggle positioning mounting assembly includes a floating friction-based wire/brake mechanism. When the single actuation mechanism is actuated, the goggles may undergo movement in three directions, namely up/down, fore/aft, and tilt. For fore/aft movement, the mounting assembly, which comprises an upper portion and a lower portion, pivots at a rotatable junction connecting the upper portion to the lower portion as the goggles translocate between the fore and aft positions. In this arrangement, the mounting assembly comprises a tension module comprising at least one spring and at least one wire, and a rotatable module comprising a plurality of rollers and internal braking components, wherein the single actuation mechanism releases friction on each of the internal braking components when actuated to provide the at least three degrees of freedom.

According to yet another embodiment, the goggle positioning mounting assembly includes a floating mechanical brake-based mechanism. When the single actuation mechanism is actuated, the goggles may undergo movement in three directions, namely, up/down, fore/aft, and tilt. For fore/aft movement, the mounting assembly, which comprises an upper portion and a lower portion, pivots at a rotatable junction connecting the upper portion to the lower portion as the goggles translocate between the fore and aft positions. In this arrangement, the mounting assembly comprises a tension module comprising at least one spring and a rotatable module comprising a plurality of rollers and internal braking components, wherein the single actuation mechanism releases tension on each of the internal braking components when actuated to provide the at least three degrees of freedom. Although the floating mechanical brake-based mechanism has components in common with the floating friction-based wire/brake mechanism, the two mechanisms are functionally and mechanically distinct, as described in additional detail below.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other objects, features and advantages of the present disclosure will become more apparent.

FIG. 1A illustrates a side perspective view of a user wearing a helmet, the sliding mechanism mounting assembly, and goggles, with the sliding mechanism in the retracted (aft) position and with a cam-based locking component according to the techniques provided herein.

FIG. 6 illustrates a cross-sectional view of the floating friction-based wire/brake mechanism mounting assembly of FIG. 5.

FIG. 7 illustrates an exploded perspective view of the rotatable module with components of the tension module of the floating friction-based wire/brake mechanism mounting assembly of FIGS. 5 and 6.

FIG. 9B illustrates another side perspective view of a user wearing a helmet, the floating mechanical brake-based mechanism mounting assembly of FIG. 9A, and goggles, with the floating mechanical brake-based mechanism in the retracted (aft) position according to the techniques provided herein.

DETAILED DESCRIPTION OF THE INVENTION

Figure 1B:
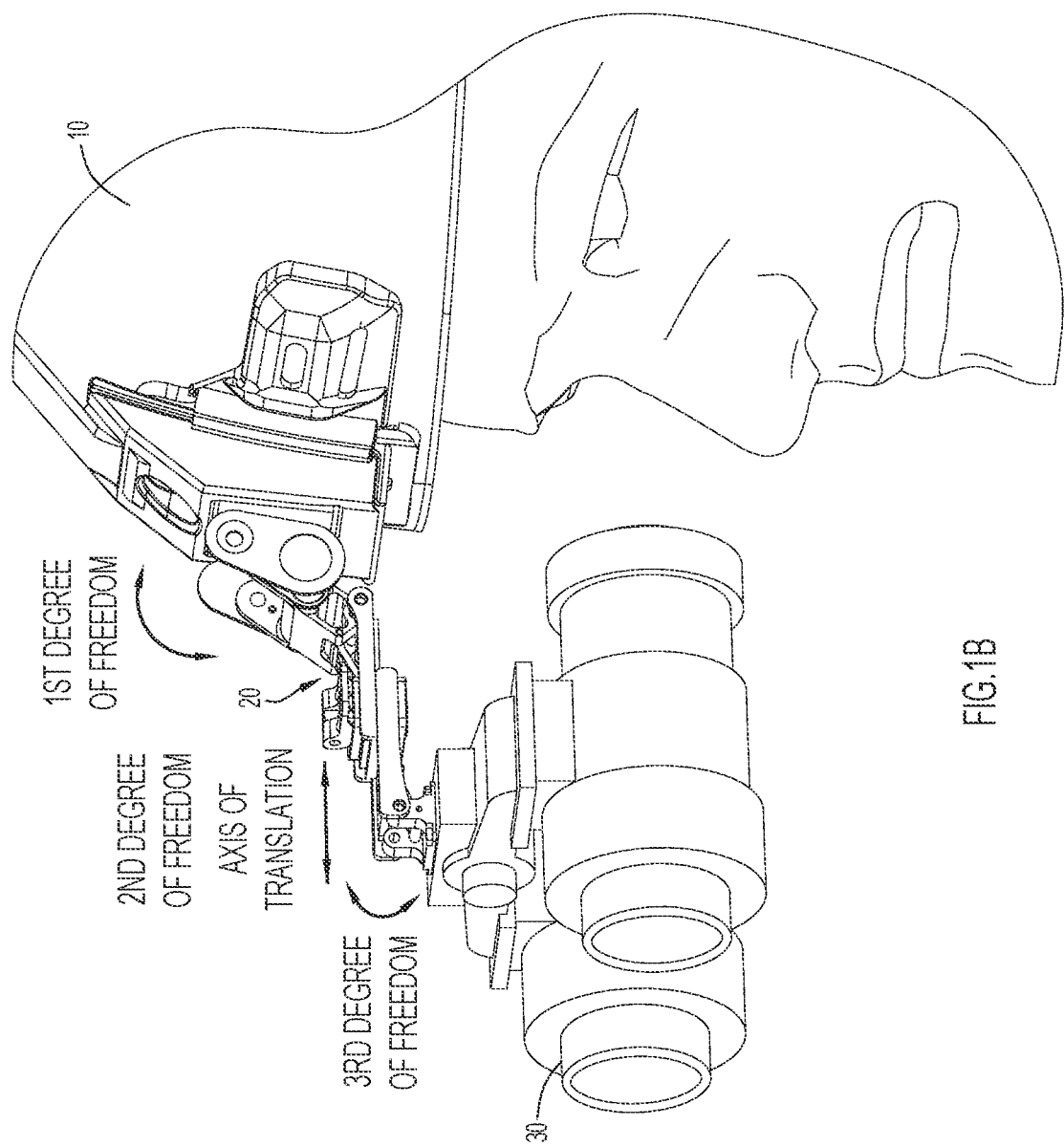
FIG. 1B illustrates a side perspective view of a user wearing a helmet, the sliding mechanism mounting assembly of FIG. 1A, and goggles, with the sliding mechanism in the extended (fore) position.

Referring to the drawing Figures, embodiments are shown of a single actuation goggle positioning mounting assembly for positioning goggles, each embodiment with a single actuation mechanism (e.g., a cam-based locking component, a screw type lock, a switch/knob, a button, etc.) and having three degrees of freedom including a fore/aft position, an up/down position, and a tilt position. In some aspects, the mounting assembly may be integrated into the goggle device. In other aspects, the mounting assembly may be integrated into the helmet. The single actuation goggle positioning mounting assembly has a reduced overall weight as compared to other mounting assemblies, and allows for improved ease and speed of positioning, improved system control, additional space for electronics, and a simplified interface (single actuation) that provides three degrees of freedom with one actuation mechanism.

For the following discussion, and in regard to all embodiments, it will be understood that the mounting assembly may comprise one or more of the same type of component. For example, the mounting assembly may contain multiple linkages 303, rotation sliders 304, cam lock nuts 310, etc. These components may be referred to generally in numeric format, and specifically, in numeric/alphabetic format. For example, linkages may generally be designated as linkage 303, with specific linkages shown in the figures as linkages 303a, 303b, etc. Additionally, while connectivity is generally described using screws and components that may threadably receive one or more screws, many other types of connections (e.g., non-threadable connections including hinges, posts, etc.) are suitable for the embodiments provided herein and are intended to fall within the scope of the present embodiments.

Referring to FIG. 1A, an embodiment of a single actuation goggle positioning mounting assembly for positioning goggles is shown. In this figure, a human operator/user is shown wearing a helmet 10, the mounting assembly 20, and goggles 30. The mounting assembly allows three degrees of freedom including an up/down position (first degree of freedom), a fore/aft position (second degree of freedom), and a tilt position (third degree of freedom) as shown by the three arrows.

The uppermost curved arrow shows a first degree of freedom relative to the up/down position of the mounting assembly and goggles. A rotation base 302 is integrated with the helmet 10, allowing the mounting assembly to be deployed in the down position (as shown in FIGS. 1A and 1B) or in the up position (not shown) in which the sliding mechanism and goggles are proximal to the helmet.

The middle straight arrow shows a second degree of freedom relative to the fore/aft position of the mounting assembly and goggles. A sliding mechanism allows the mounting assembly to be deployed in a retracted (aft) position (as shown in FIG. 1A) or in an extended (fore) position (as shown in FIG. 1B).

The lower curved arrow shows a third degree of freedom relative to the tilt position of the mounting assembly and goggles. A goggle linkage 307, allows the mounting assembly to be tilted such that the goggles are angled upwards or downwards relative to the fore/aft axis of translation of the sliding mechanism.

Figure 4B:
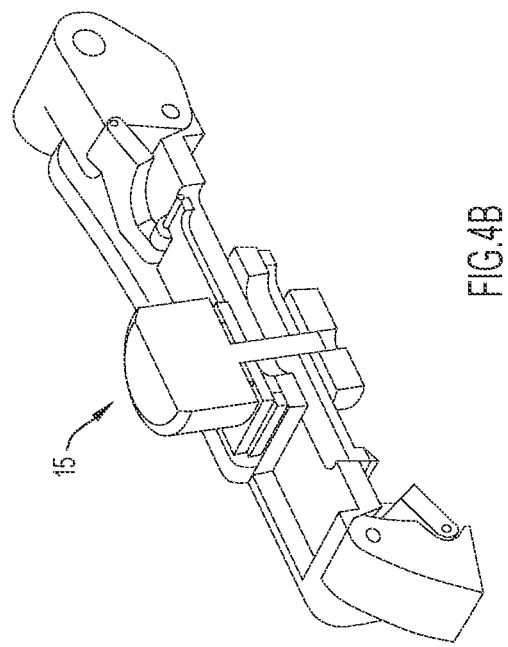
FIG. 4B illustrates a cross-sectional view of the sliding mechanism mounting assembly of FIG. 4A.
Figure 4A:
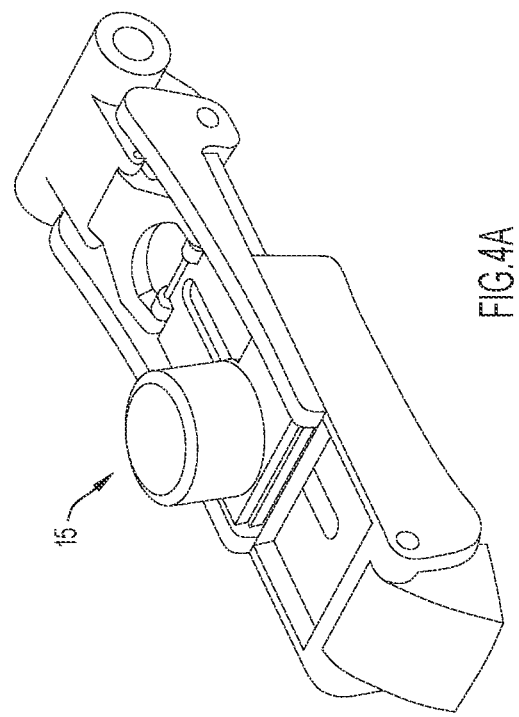
FIG. 4A illustrates a side perspective view of another embodiment of a sliding mechanism mounting assembly, with a screw type lock, and the mounting assembly in the extended (fore) position, according to the techniques provided herein.

In this configuration, a cam-based locking component (e.g., a cam over center-style lock) is used to lock the position of the mounting assembly into a fixed position. Other embodiments of a single actuation mechanism for a sliding mechanism with a center lock are shown in FIGS. 4A and 4B.

Referring to FIG. 1B, the single actuation goggle positioning mounting assembly shown in FIG. 1A is illustrated in the extended (fore) position. A human operator is shown wearing a helmet 10, the helmet mounting assembly 20, and goggles 30. Similar to FIG. 1A, the uppermost curved arrow shows a first degree of freedom relative to the up/down position of the mounting assembly and goggles, while the lowermost curved arrow shows a third degree of freedom relative to the tilt position of the mounting assembly. The middle straight arrow shows a second degree of freedom relative to the fore/aft position of the sliding mechanism mounting assembly. In this figure, the sliding mechanism is shown in an extended position.

Figure 2:
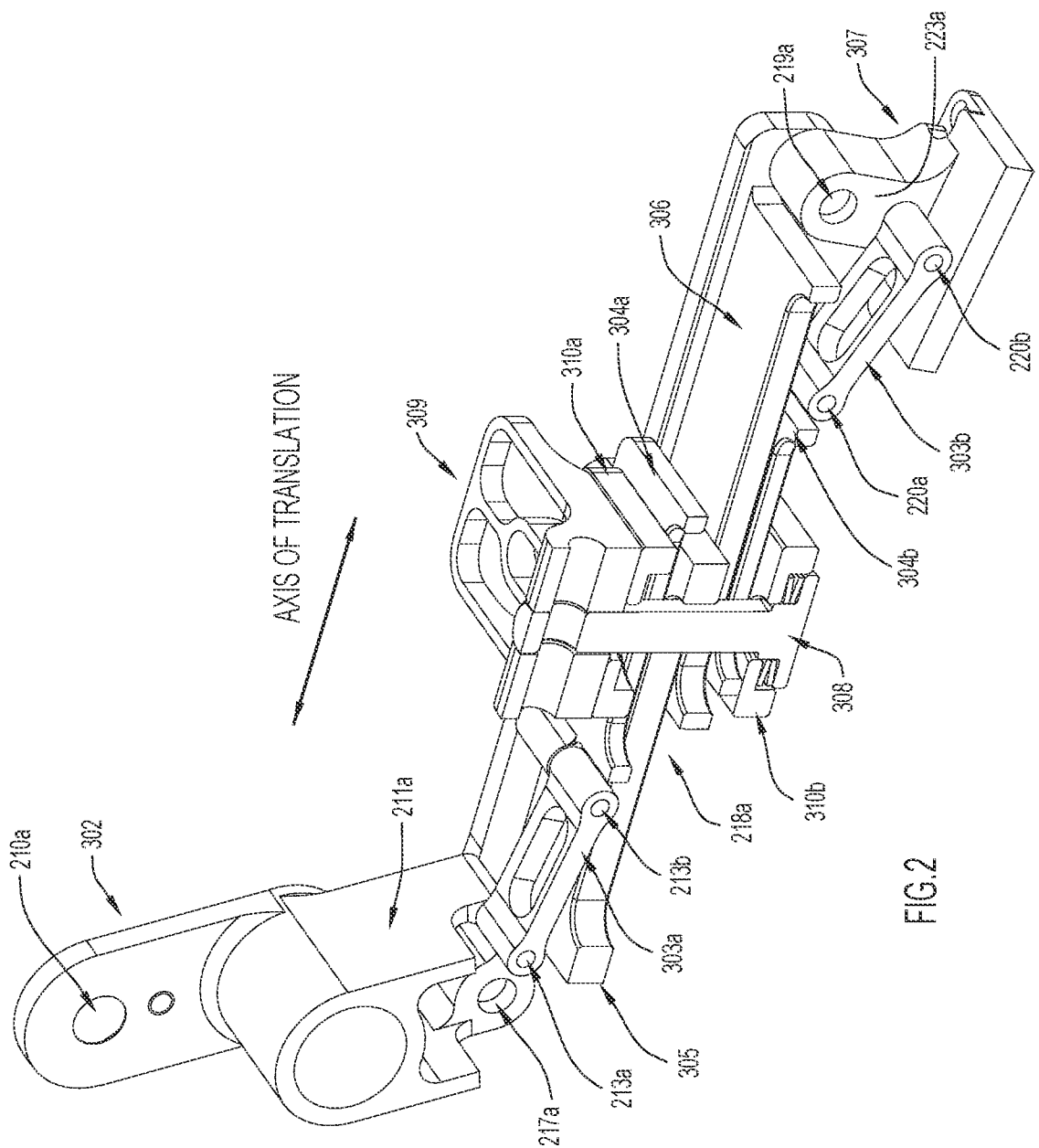
FIG. 2 illustrates a cross-sectional view of the sliding mechanism mounting assembly of FIGS. 1A and 1B.

FIG. 2 illustrates a cross-sectional view of the sliding mechanism mounting assembly of FIGS. 1A and 1B. For the following discussion, reference is also made to FIGS. 3A and 3B, which show features that may not be visible in the cross-sectional view of the assembled sliding mechanism of FIG. 2.

A sliding mechanism comprises: linkages 303a and 303b, rotation sliders 304a and 304b, a top support arm 305, and a bottom support arm 306 (see also FIGS. 3A and 3B) as well as additional components. In this figure, rotation base 302 is used to secure the mounting assembly to the helmet 10. The upper portion of the rotation base includes a set of rotation base openings 210a and 210b (see also FIG. 3A), which may threadably receive one or more screws, to integrate the rotation base with the helmet.

The lower portion of the rotation base 302 has two downward extending rotation base prongs 211a and 211b, each rotation base prong having a rotation base prong opening 217a, 217b extending laterally through the rotation base prong, for threadably receiving one or more screws to connect the rotation base to top support arm 305 via top support arm prong openings 216a and 216b (see also FIG. 3A) on top support arm prongs 215a and 215b. Once connected, the top support arm may undergo rotation to position the mounting assembly in an up or down configuration, with the up configuration positioning the mounting assembly and goggles proximal to the helmet and the down configuration positioning the mounting assembly and goggles away from the helmet (with the down configuration shown in FIGS. 1A and 1B).

Figure 3A:
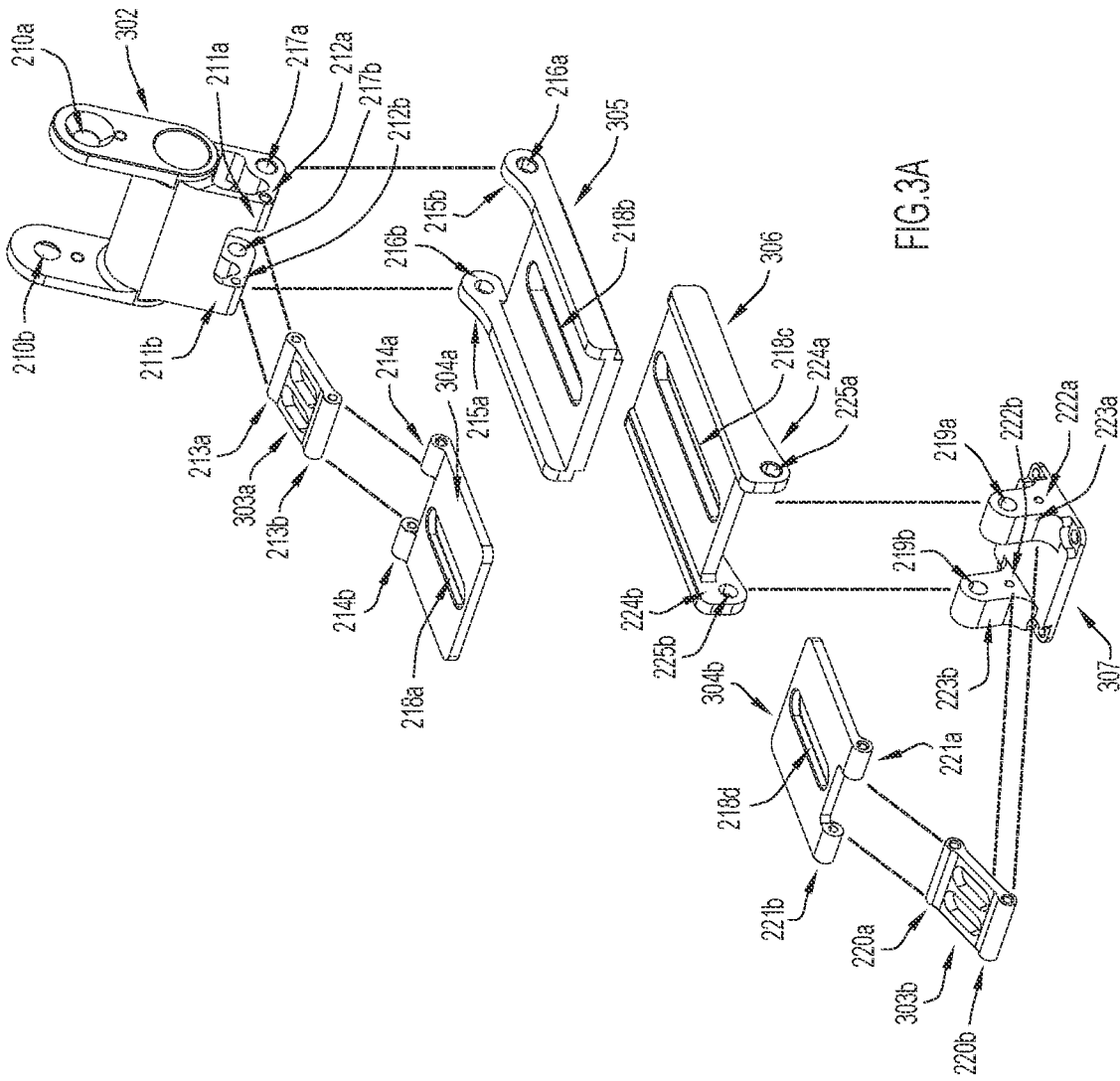
FIG. 3A illustrates an exploded perspective view of the plurality of sliding elements of FIGS. 1A, 1B and 2.

Top linkage 303a has an opening at each end (first and second lateral top linkage openings 213a, 213b) that extends laterally through the linkage and is configured to threadably receive one or more screws. A first end of top linkage 303a may be connected to the rotation base 302 with one or more screws, via secondary base prong openings 212a and 212b of the rotation base (see FIG. 3) and the first lateral top linkage opening 213a. A second end of top linkage 303a may be connected to a top rotation slider 304a, with one or more screws via a top rotation slider lateral hinge opening 214a, the second lateral top linkage opening 213b, and a top rotation slider lateral hinge opening 214b, as shown in FIG. 3A. In this figure, one end of top rotation slider 304a is configured to receive one end of top linkage 303a.

Top support arm 305 has two top support arm prongs (215a, 215b) that extend from the supporting arm. Each top support arm prong has a top support arm prong opening (216a, 216b) to threadably receive one or more screws to connect the top support arm to the rotation base. Thus, and with reference to FIG. 3, the top support arm 305 is connected to the rotation base 302 with one or more screws, via top support arm prong opening 216a, rotation base prong opening 217a, rotation base prong opening 217b, and top support arm prong opening 216b.

As the top support arm 305 is rotated (first degree of freedom) between an up and down position, top linkage 303a, which is connected to top rotation slider 304a and rotation base 302, causes movement of the top rotation slider. A cam lock post 308, threaded through top rotation slider slot 218a (and slots of other sliding mechanism components such as top support arm slot 218b, bottom support arm slot 218c, bottom rotation slider slot 218d, etc.), allows movement of the sliding mechanism elements when unlocked as explained further below.

Referring back to FIG. 2, the top rotation slider 304a is positioned atop top support arm 305. Top support arm 305 is positioned atop bottom support arm 306. Bottom support arm 306 is positioned atop bottom rotation slider 304b. Each of these components (top rotation slider 304a, bottom rotation slider 304b, top support arm 305, bottom support arm 306) has a respective slot extending along the length of the respective component. A cam lock post 308 extends through each of these slots, allowing translation of the sliding mechanism to achieve three degrees of freedom with a single locking component. The amount of movement is limited by the length of the slot of the respective component.

The upper portion of goggle linkage 307 has two upward extending goggle linkage prongs 223a and 223b, each goggle linkage prong having a goggle linkage opening prong 219a and 219b extending laterally through the respective goggle linkage prong, for threadably receiving one or more screws to connect the goggle linkage 307 to bottom support arm 306. Once connected, the goggle linkage may undergo rotation to position the goggles in a tilt configuration. Bottom linkage 303b controls the position of the goggle linkage. Bottom linkage 303b has an opening at each end (first and second lateral bottom linkage openings 220a, 220b) that extends laterally through the linkage and is configured to threadably receive one or more screws. A first end of bottom linkage 303b may be connected to the bottom rotation slider 304b via bottom rotation slider lateral hinge openings 221a, 221b (see FIG. 3) extending from the bottom rotation slider 304b. The respective openings (bottom rotation slider lateral hinge opening 221a, lateral bottom linkage opening 220a, and bottom rotation slider lateral hinge opening 221b) may threadably receive one or more screws to connect bottom linkage 303b to bottom rotation slider 304b. A second end of bottom linkage 303b may be connected to the goggle linkage via secondary goggle linkage openings 222a, 222b (see FIG. 3).

With reference to FIGS. 2 and 3, bottom support arm 306 is configured to receive goggle linkage 307 and may be secured to each other using one or more screws. Bottom support arm 306 has two bottom support arm prongs 224a and 242b that extend from the bottom support arm, each bottom support arm prong with a respective bottom support arm prong opening 225a and 225b. The openings, in order of bottom support arm prong opening 225a, goggle linkage prong opening 219a, goggle linkage prong opening 219b, and bottom support arm prong opening 225b, are configured to threadably receive one or more screws to connect the bottom support arm 306 to goggle linkage 307.

Cam lock post 308 is threaded through various slots of the sliding mechanism mounting assembly allowing the position of the goggles to be locked into place with respect to the three degrees of freedom. As shown in FIG. 2, the cam lock post extends through respective slots of the following components in order: cam lock nut 310b, slot 218d of bottom rotation slider 304b, slot 218c of bottom support arm 306, slot 218b of top support arm 305, slot 218a of top rotation slider 304a, cam lock nut 310a, and cam lock lever 309. When the cam lock post and cam lock nut are loosened, the components of the sliding mechanism may move to allow three degrees of freedom of the goggles. When the cam lock post and cam lock nut are tightened, the components of the sliding mechanism are locked into place, fixing the position of the goggles.

FIG. 3A illustrates an exploded perspective view of the plurality of sliding elements of the sliding mechanism mounting assembly of FIGS. 1A, 1B, and 2. In this figure, the dashed lines show physical connections (e.g., secured by one or more screws) between the components. Top rotation slider 304a, top support arm 305, bottom support arm 306, bottom rotation slider 304b are adjacent to each other, in the respective order listed, and are configured to slide past each other, when the cam lock post 308 is not locked. Cam lock post 308 is positioned within respective slots of each component to control movement. FIG. 3A (see also, FIG. 2) show the order of assembly of the components, with additional components shown with respect to FIG. 3B.

Figure 3B:
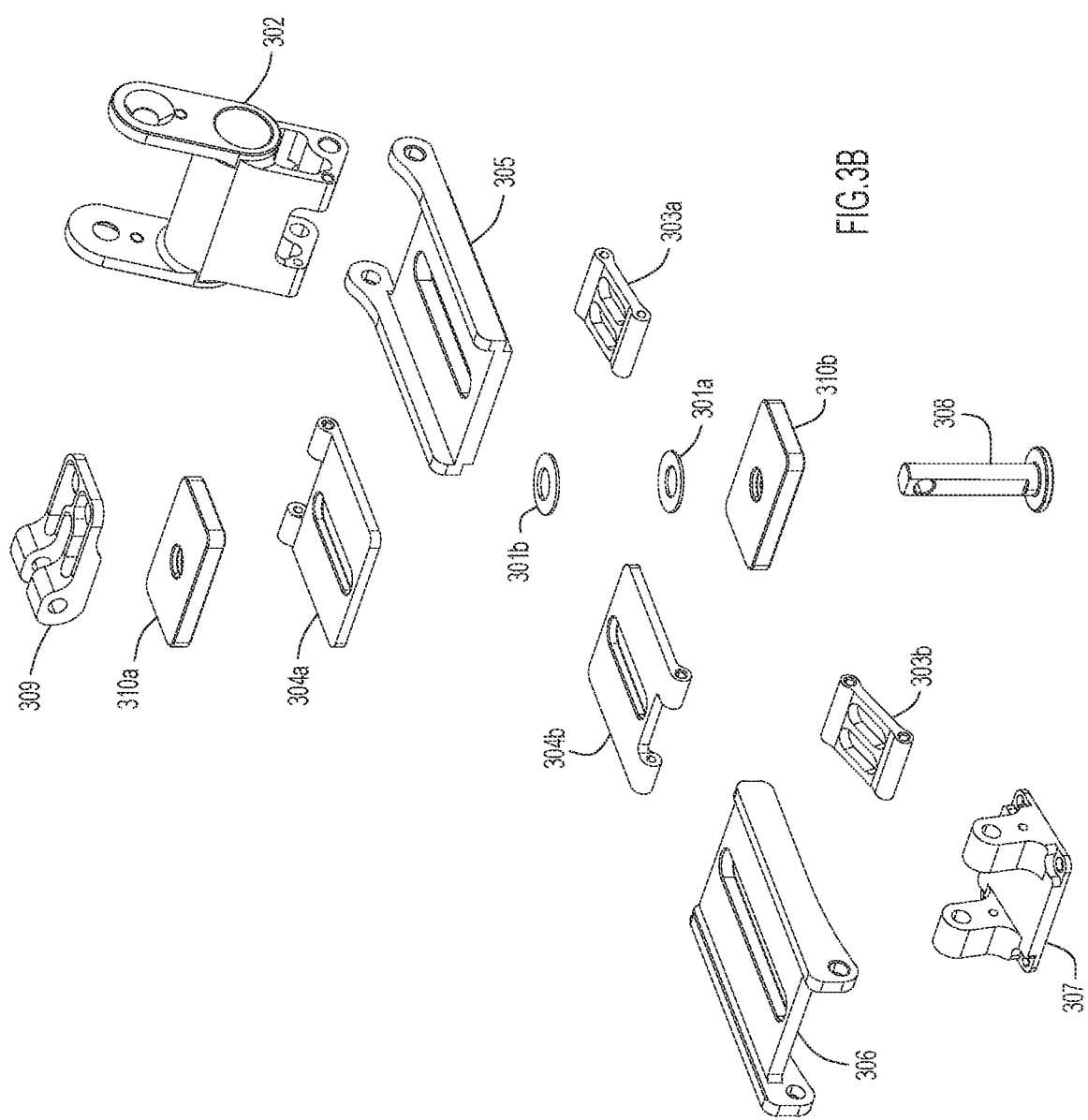
FIG. 3B illustrates an exploded perspective view of the components of the sliding mechanism mounting assembly of FIGS. 1A, 1B and 2.

FIG. 3B shows another exploded view of the components of the sliding mechanism, not in order of assembly. A component listing is provided as follows: Spring Belleville disc 301a, spring Belleville disc 301b, rotation base 302, top linkage 303a, bottom linkage 303b, top rotation slider 304a, bottom rotation slider 304b, top support arm 305, bottom support arm 306, goggle linkage 307, cam lock post 308, cam lock lever 309, cam lock nut 310a, and cam lock nut 310b. The spring Belleville disc may be positioned between the cam lock post and the cam lock nut.

FIGS. 4A and 4B show an alternate embodiment of a sliding mechanism mounting assembly, with a screw type lock 15 instead of a cam-based locking component (e.g., cam lock lever 309, cam lock post 308, and cam lock nuts 310a, 310b). In this figure and with respect to FIGS. 1-3B, the cam-based locking component is replaced with a screw type lock 15, with all other components remaining the same. In particular, FIG. 4A illustrates a side perspective view of the sliding mechanism mounting assembly, with the mounting assembly in the extended (fore) position with screw type lock 15.

FIG. 4B illustrates a cross-sectional view of the sliding mechanism mounting assembly of FIG. 4A. In this configuration, the screw type lock 15 may be loosened to allow motion with respect to three degrees of freedom, and when tightened, the position of the goggles is locked into place.

Figure 5:
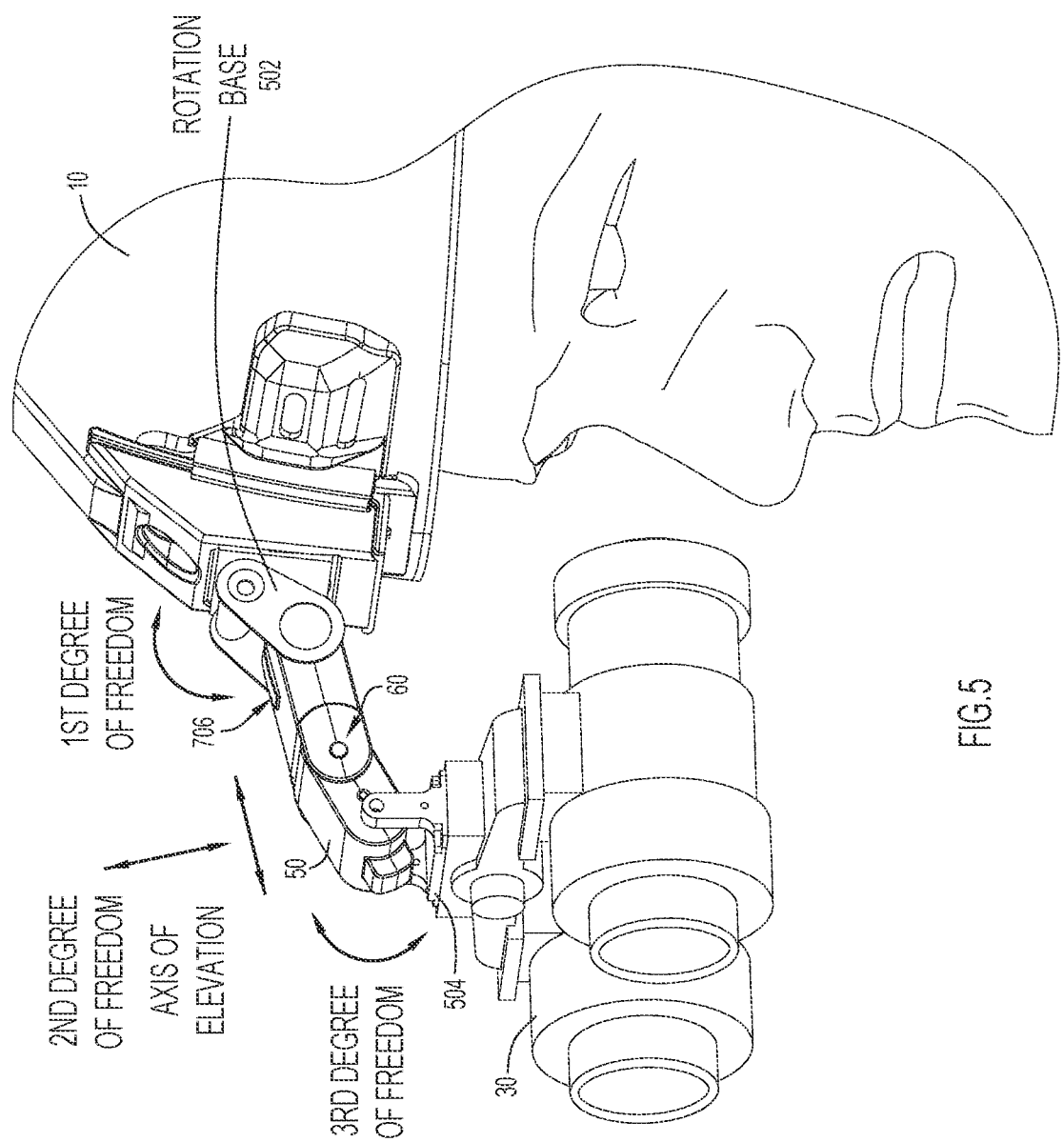
FIG. 5 illustrates a side perspective view of a user wearing a helmet, a floating friction-based wire/brake mechanism (covered by a shell) mounting assembly, and goggles, with the mounting assembly in the extended (fore) position according to the techniques provided herein.

Referring to FIG. 5, another embodiment of a single actuation goggle positioning mounting assembly with a different mechanism, a floating friction-based wire/brake mechanism, for positioning goggles is shown. In this figure, a human operator is shown wearing a helmet 10, a floating friction-based wire/brake mechanism mounting assembly 50, and goggles 30. The mounting assembly allows three degrees of freedom including an up/down position (first degree of freedom), a fore/aft position (second degree of freedom), and a tilt position (third degree of freedom) as shown by the three solid arrows.

The uppermost curved arrow shows a first degree of freedom relative to the up/down position of the mounting assembly and goggles. A rotation base 502 is attached to the helmet, allowing the mounting assembly to be deployed in the down position (as shown in FIG. 5), or in the up position (not shown) in which the mounting assembly and goggles are proximal to the helmet. As shown in FIG. 5, the upper portion of the rotation base includes a set of openings, which may threadably receive one or more screws, to fasten the rotation base to the helmet. The lower portion of the rotation base has a set of openings to connect the mounting assembly to the goggle linkage 504.

Once connected, the mounting assembly may undergo rotation at the connection between the rotation base and the mounting assembly to position the mounting assembly in an up or down configuration, with the up configuration positioning the mounting assembly proximal to the helmet and the down configuration positioning the mounting assembly in the position shown in FIG. 5.

The middle horizontal arrow shows a second degree of freedom for the fore/aft position of the mounting assembly and goggles. The floating friction-based wire/brake mechanism mounting assembly is shown, along with a translation axis (solid arrows) and an axis of elevation (dashed arrows). The mounting assembly pivots, via rotatable junction 60 at or near the center of the mounting assembly allowing the mounting assembly to have an extended length (fore) position (as shown in FIG. 5) or a retracted length (aft) position (not shown). It is understood that in the aft position, rotatable junction 60 translates along an elevation plane to become elevated, while the ends of the mounting assembly, connected to goggle linkage 504 and rotation base 502, are positioned lower than rotatable junction 60 (e.g., similarly to FIG. 9B).

The lower curved arrow shows a third degree of freedom relative to the tilt position of the mounting assembly and goggles. A goggle linkage 504 (see also, FIG. 7) allows the mounting assembly to be tilted such that the goggles are angled upwards or downwards relative to the fore/aft axis of the floating friction-based wire/brake mechanism.

A knob 706 locking mechanism is used to lock or unlock the mounting assembly into a fixed position or movable configuration.

FIG. 6 illustrates a cross-sectional view of the floating friction-based wire/brake mechanism mounting assembly of FIG. 5. The distal end of the floating friction mounting assembly (relative to the helmet) comprising lower top link 709 and lower bottom link 710 is connected to the goggle linkage as shown in FIG. 5. In particular, and with reference to FIG. 7, the upper portion of the goggle linkage 504 has two upward extending goggle linkage prongs 714a and 714b, each goggle linkage prong having a goggle linkage opening 715a and 715b, extending laterally through the goggle linkage prong, for threadably receiving one or more screws to connect the goggle linkage 504 to lower top shell 709 and lower bottom shell 710. Once connected, the goggle linkage may undergo rotation to position the goggles in a tilt configuration.

With reference to FIG. 6, three sets of rotating components are provided, partially shown in the cross-section as knuckles 707a, 707b and 707c. The first knuckle 707a is connected to steel extension spring 702 and a first end of wire 705a. The second knuckle 707b is connected to a second end of wire 705a and a first end of wire 705b. The third knuckle 707c is connected to a second end of wire 705b. The mounting assembly comprises a rotatable junction 60 at the intersection of the upper portion (upper shells 708, 713) and the lower portion (lower shells 709, 710). A partial view of a roller is shown as roller 711f A partial view of brakes 703b, 703d and 703f are shown in FIG. 6. Additional components are shown in FIG. 7, which are described further as follows.

FIG. 7 shows an exploded view of the components of the floating friction-based wire/brake mounting assembly. Three sets of rotatable internal components are provided, each set comprising brakes 703 (a pair), a knuckle 707, rollers 711 (a pair), and cranks/shafts 712 (a pair). Each set of rotatable internal components provides a degree of freedom with respect to positioning of the goggles.

A shell for the device comprises upper top shell 708 and upper bottom shell 713, which forms the upper portion of the mounting assembly, along with lower top shell 709 and lower bottom shell 710, which forms the lower portion of the mounting assembly. The upper portion is connected via the rotation base to the helmet, and the lower portion is connected to the goggles via the goggle linkage. The function of a set is described in additional detail as follows, and with further reference to FIG. 6.

Knob 706, when translocated or depressed, allows positioning of the mounting assembly with respect to three degrees of freedom by releasing tension on the rotatable module via brakes 703a-703f. When force is applied via translocation of knob 706 to displace the brakes and reduce contact with respective rollers, the mounting assembly becomes unlocked and may be moved with respect to the three degrees of freedom.

The rotatable module comprises three sets of components. Each set comprises a pair of brakes 703, a pair of rollers 711, a pair of shafts 712, and a knuckle. For example, the first set of components comprises roller 711e, roller 711f, shaft 712e, shaft 712f, brake 703e, brake 703f, and knuckle 707c. Knuckle 707c is connected to the second end of wire 705b via an opening 716c in the outer surface of knuckle 707c, providing for a first degree of freedom.

To assemble a (rotatable) set, a first end of knuckle 707c connects to a first shaft 712e, and a second end of knuckle 707c connects to a second shaft 712f to form a first axis comprising shaft 712e-knuckle 707c-shaft 712e. One end of the first axis is positioned within roller 711e and the other end of the first axis is positioned within roller 711f. The outer surface of roller 711e is in contact with brake 703e, and the outer surface of roller 711f is in contact with brake 703f.

The rollers and first axis are positioned in their respective grooves shown in upper shells 708, 713. For example, shaft/crank 712e is positioned in shaft grooves 720a and 720b, such that roller 711e fits in a region between these shaft grooves. Brake 703e is positioned so that protruding rod 722a of brake 703e is positioned in rod groove 721a. Shaft 712f, roller 711f, and brake 703f are similarly positioned within the other side of the upper shell. Brake 703e is in contact with the outer surface of roller 711e. When knob 706 is translocated/depressed, tension on the rollers from brakes 703a-703f is reduced, allowing the user to rotate the mounting assembly with respect to the three degrees of freedom. When the knob is released, the brakes 703 are again in contact with the rollers 711, as the spring 702 provides counter-tension to restore the position of the brakes, bringing them into contact with the outer surface of the rollers and locking the mounting assembly into place.

The second set comprises roller 711c, roller 711d, shaft 712c, shaft 712d, brake 703c, brake 703d, and knuckle 707b. The second set is connected to the first end of wire 705b, and to the second end of wire 705a, and provides for a second degree of freedom.

To assemble the second set, a first end of knuckle 707b connects to a first shaft 712c, and a second end of knuckle 707b connects to a second shaft 712d to form a second axis comprising shaft 712c-knuckle 707b-shaft 712d. One end of the second axis is positioned within roller 711c and the other end of the second axis is positioned within roller 711d. The outer surface of roller 711c is in contact with brake 703c, and the outer surface of roller 711d is in contact with brake 703d. The second axis and its components are positioned within respective grooves, similarly to the first axis and its components.

When force is applied to the brakes (via translocation of knob 706) to displace the brakes and reduce contact with respective rollers, rotatable junction 60 rotates with respect to the elevation plane, to control the length of the mounting assembly with respect to fore and aft positions. The rotatable junction may rotate to elevate the center of the mounting assembly, at the position where the upper portion comprising upper shells 708 and 713 join with the lower portion comprising lower shells 709 and 710, while the ends of the mounting assembly remain fixed to the helmet and to the goggles.

The third set comprises roller 711a, roller 711b, shaft 712a, shaft 712b, brake 703a, brake 703b, and knuckle 707a. The third set is connected to steel extension spring 702 and a first end of wire/cord 705a, and provides for a third degree of freedom. The steel extension spring 702 is also anchored to lower shells 709, 710 as shown in FIG. 6. When force is applied to the brakes (via translocation of knob 706) to displace the brakes and reduce contact with respective rollers, the rollers become free to rotate, allowing the rotation base to rotate and provide a third degree of freedom.

Figure 11:
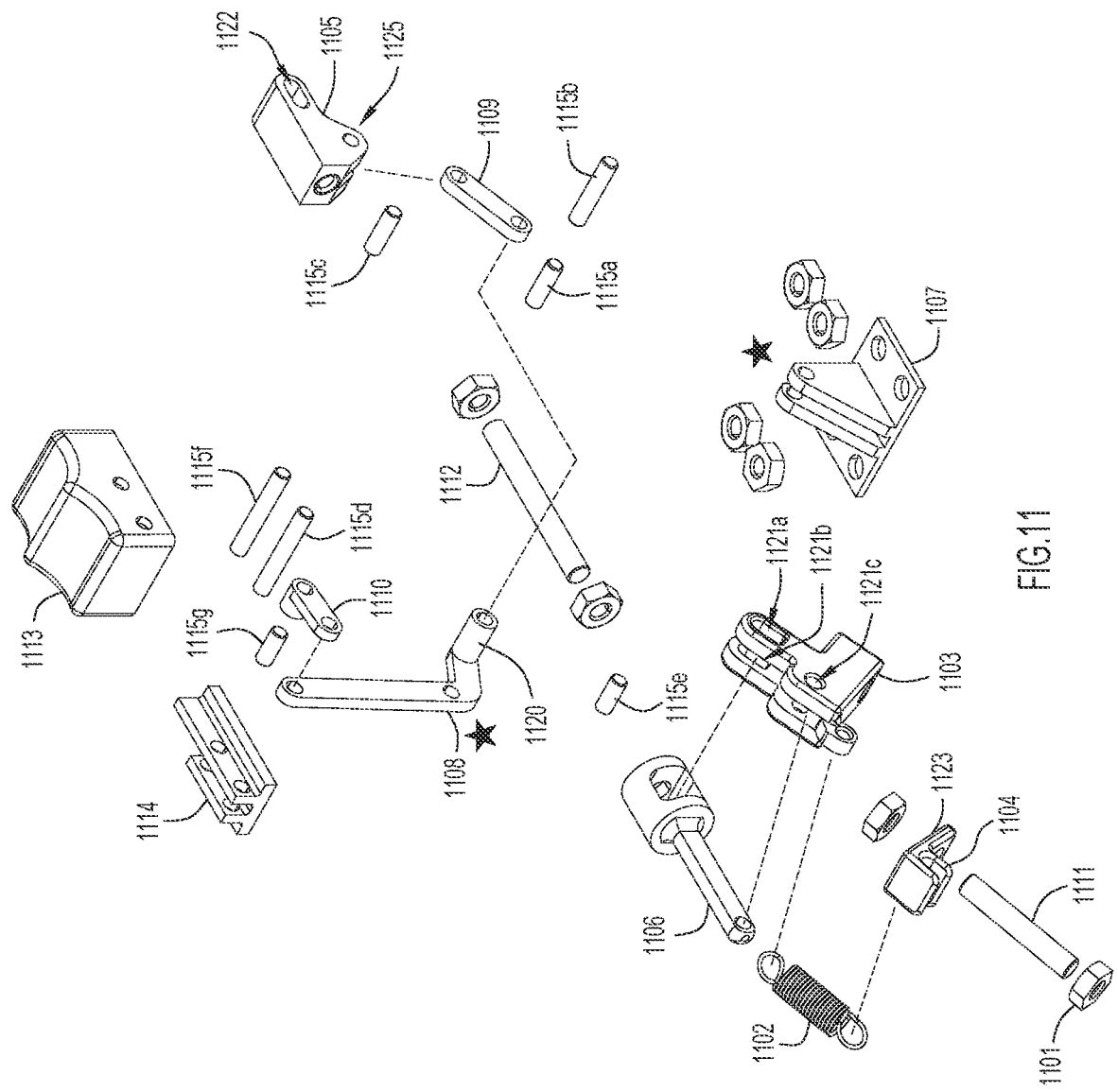
FIG. 11 illustrates an exploded perspective view of the tension module of the floating mechanical brake-based mechanism mounting assembly of FIGS. 9A, 9B and 10.

The tension module comprises spring 702, wire 705a, and wire 705b. When knob 706 is translocated, force is distributed to brakes 703, changing the position of the brakes so that the brakes are no longer in contact or are in reduced contact with their respective rollers 711, thereby allowing movement of the mounting assembly with three degrees of freedom. Transmission of force from the knob 706 to the brakes 703 may be achieved in a manner similar as shown in FIG. 11, in which movement of the knob causes a displacement in a connecting component (e.g., a connecting component such as a switch arm 1108 transmits force to a pin guide 1105 via a link arm 1109). Alternatively, the knob may directly contact brakes 712e and 712f In some aspects, knob 706 interacts with connecting rod/wire 705b. For example, knob 706 may be connected to the distal end of wire 705b via one or more connecting components, and may function in a manner similar to knob 1113, as shown in another embodiment in FIG. 11. Force is distributed to the brakes via dowel pins (e.g., dowel pins that connect the brakes to the connecting components, which are all displaced by force from movement of the knob). Wire 705b distributes force from the first set of components to the second set of components, thereby changing the position of brakes 703c and 703d. Wire 705a distributes force from the second set of components to the third set, thereby changing the position of brakes 703a and 703b. Spring 702 provides a restoring force to the brakes, such that the restoring force is distributed to the brakes via wire 705a and knuckle 707a, knuckle 707b and wire 705b, and knuckle 707c with their respective connecting parts.

Figure 8B:
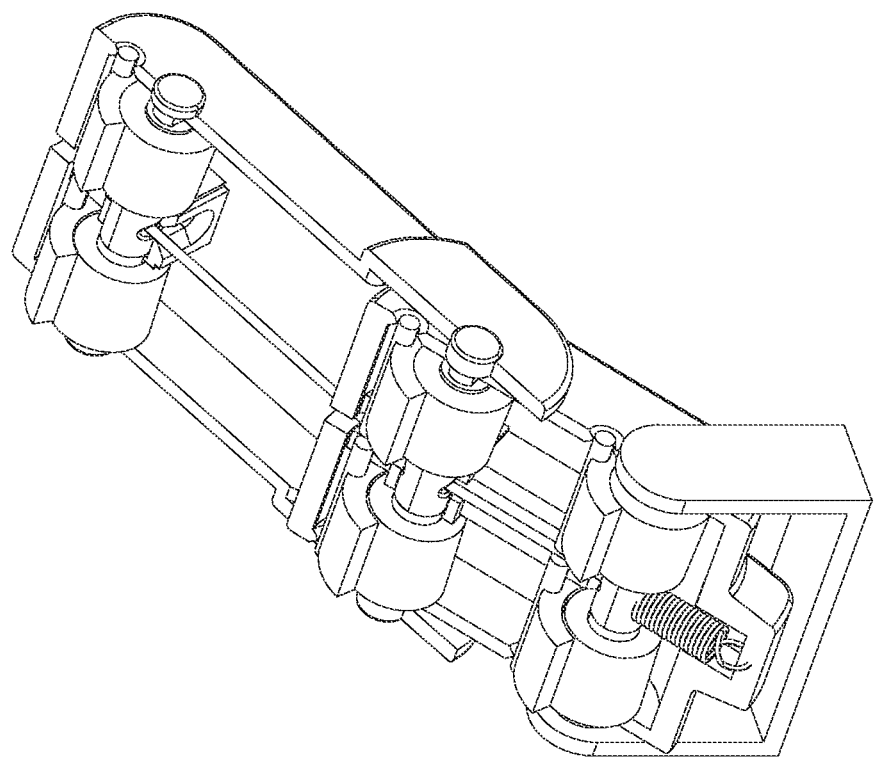
FIG. 8B illustrates another side perspective view of the floating friction-based wire/brake mechanism mounting assembly of FIG. 8A, with the top shell removed to expose components of the friction-based wire/brake mechanism.
Figure 8A:
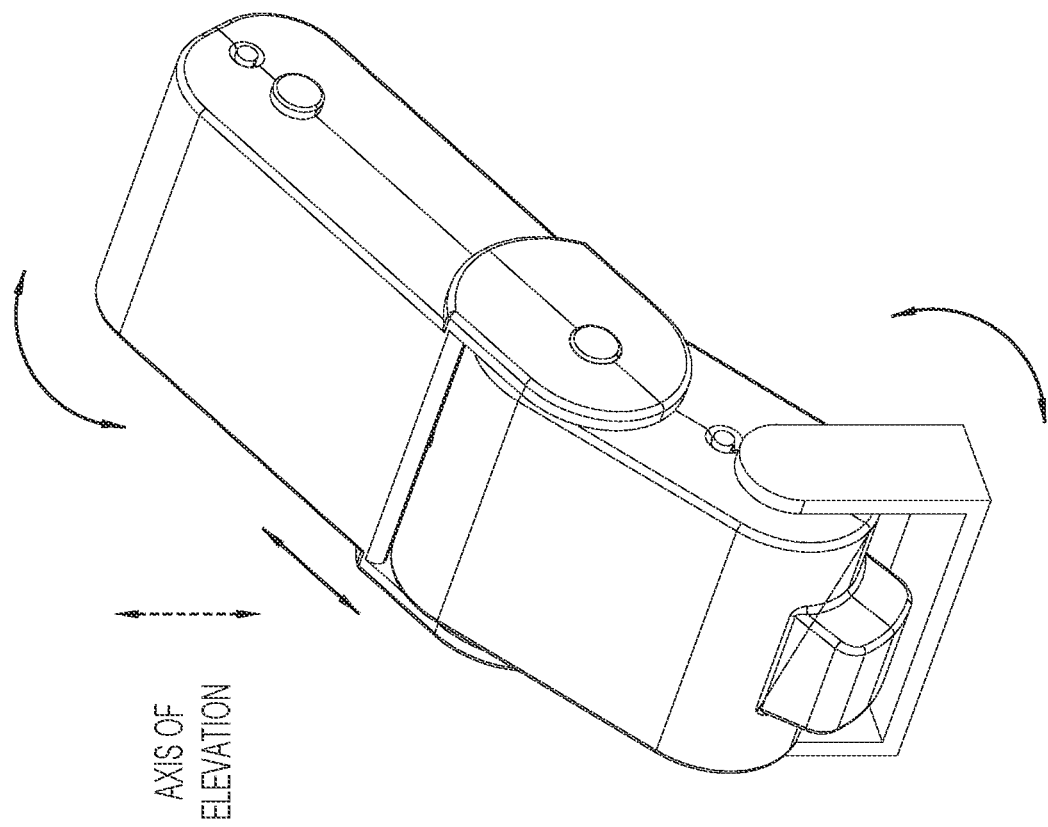
FIG. 8A illustrates a side perspective view of a floating friction-based wire/brake mechanism mounting assembly, with the mounting assembly in the extended (fore) position according to the techniques provided herein.

FIGS. 8A and 8B show other views of the single actuation floating friction-based wire/brake mechanism mounting assembly of FIGS. 5-7 for goggle positioning. FIG. 8A shows a side view of the floating friction-based wire/brake mechanism mounting assembly with the upper and lower top shells. The mounting assembly allows three degrees of freedom including a fore/aft position, an up/down position, and a tilt position as shown by the three arrows.

FIG. 8B shows the single actuation floating friction-based wire/brake mechanism mounting without the upper and lower top shells. The connectivity of the rotatable module and the tension module is shown. When the brakes are in contact with the rollers, the mounting assembly is locked into position. When contact between the brakes and rollers is reduced, rotation occurs at the location of the rollers to provide three degrees of freedom.

Figure 9A:
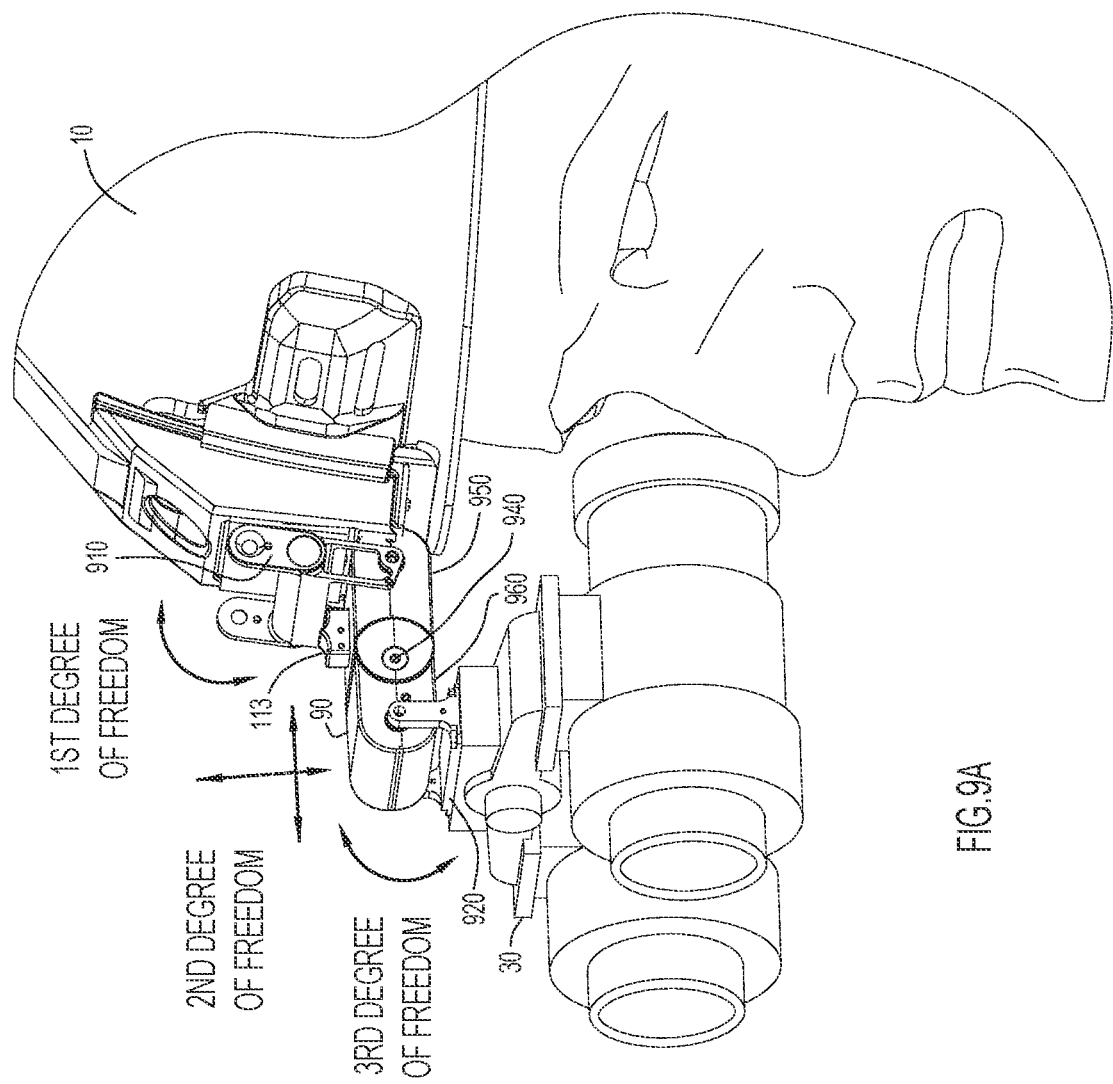
FIG. 9A illustrates a side perspective view of a user wearing a helmet, a floating mechanical brake-based mechanism mounting assembly, and goggles, with the floating mechanical brake-based mechanism in the extended (fore) position according to the techniques provided herein.

Referring to FIG. 9A, another embodiment of a single actuation goggle positioning mounting assembly with a different mechanism, a single actuation floating mechanical brake-based mechanism, is shown. In this figure, a human operator is shown wearing a helmet 10, a helmet mounting assembly 90, and goggles 30. The mounting assembly allows three degrees of freedom including an up/down position (first degree of freedom), a fore/aft position (second degree of freedom), and a tilt position (third degree of freedom) as shown by the three solid arrows.

The uppermost curved arrow shows a first degree of freedom relative to the up/down position of the mounting assembly and goggles. To achieve this, a rotation base 910 is attached to the helmet, allowing the mounting assembly to be deployed in the down position (as shown in FIGS. 9A and 9B) or in the up position (not shown) in which the mounting assembly and goggles are proximal to the helmet.

The middle, straight arrow shows a second degree of freedom relative to the fore/aft position of the mounting assembly and goggles. A rotating mechanism at rotatable junction 940 allows the mounting assembly to be deployed in an extended (fore) position (as shown in FIG. 9A) or in a retracted position (as shown in FIG. 9B). When the upper portion and the lower portion of the mounting assembly rotate about rotatable junction 940, the goggle moves between the fore and aft position. As the angle between the upper portion 950 and lower portion 960 increases, rotatable junction 940 is elevated (in the direction of the dashed vertical axis) and the mounting assembly reaches the aft position (see FIG. 9B). As the angle between the upper portion 950 and lower portion 960 decreases, rotatable junction 940 returns to the position shown in FIG. 9A (fore position).

The lower curved arrow shows a third degree of freedom relative to the tilt position of the mounting assembly and goggles. A goggle linkage 920 connects the goggles to the mounting assembly, and once connected, the mounting assembly may be tilted such that the goggles are angled upwards or downwards relative to the fore/aft position of the mounting assembly.

In this configuration, a locking mechanism comprising a knob/button 1113 is used to lock and unlock the position of the mounting assembly.

Referring to FIG. 9B, the single actuation mounting assembly shown in FIG. 9A is illustrated in the retracted (aft) position. A human operator is shown wearing a helmet 10, the mounting assembly 90, and goggles 30. Similar to FIG. 9A, the uppermost curved arrow shows a first degree of freedom relative to the up/down position of the mounting assembly and goggles, while the lowermost curved arrow shows a third degree of freedom relative to the tilt position of the mounting assembly. The middle vertical arrow (dashed) shows the direction of movement of rotatable junction 940 along an axis of elevation relative to the fore/aft position of the mounting assembly and goggles.

Figure 10:
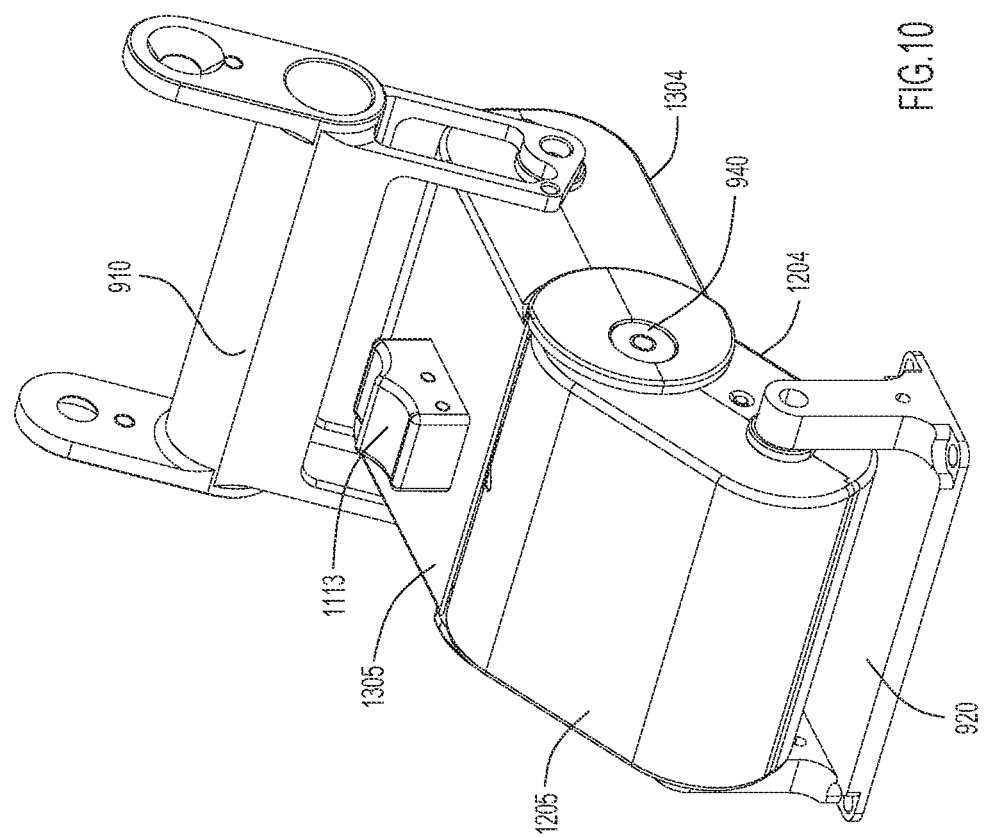
FIG. 10 illustrates a side perspective view of the floating mechanical brake-based mechanism mounting assembly, with the top shell and bottom shell shown as transparent to expose components of the mechanical brake-based mechanism.

FIG. 10 illustrates a top down side perspective view of a floating mechanical brake-based mechanism mounting assembly, with the mounting assembly in the extended (fore) position and with a single knob 1113 to lock and unlock the position of the mounting assembly. The upper portion comprises shells 1304 and 1305 while the lower portion comprises shells 1204 and 1205. Exploded views of the floating mechanical brake system are provided and assembly of the floating mechanical system is discussed with reference to FIGS. 11-13.

With further reference to FIG. 10, the floating mechanical brake-based mechanism comprises an upper portion (shells 1304 and 1305) and a lower portion (shells 1204, 1205) connected by a rotatable junction 940, allowing rotation of the upper portion with respect to the lower portion at the movable junction. The upper portion and lower portion additionally comprise a rotatable module and a tension module, described in further detail with respect to FIGS. 11-13.

Rotation base 910 connects to the upper portion, via cranks 1303a and 1303b (shown in FIG. 13), and when the switch is depressed, tension on the brakes is released, and the cranks rotate to allow up/down motion (first degree of freedom) of the goggle/mounting assembly. Similarly, goggle linkage 920 connects to cranks 1202a and 1202c (shown in FIG. 12), and when the switch is depressed, tension on the brakes is released, and the cranks rotate to allow tilting (third degree of freedom) of the goggles. When the switch is released, the brakes are in contact with the rollers, due to the counter opposing force from an internal spring, allowing positions of the rotation base 910, rotatable junction 940, and the goggle linkage 920 to be locked into place. Thus, a single switch controls motion in three directions.

Figure 14:
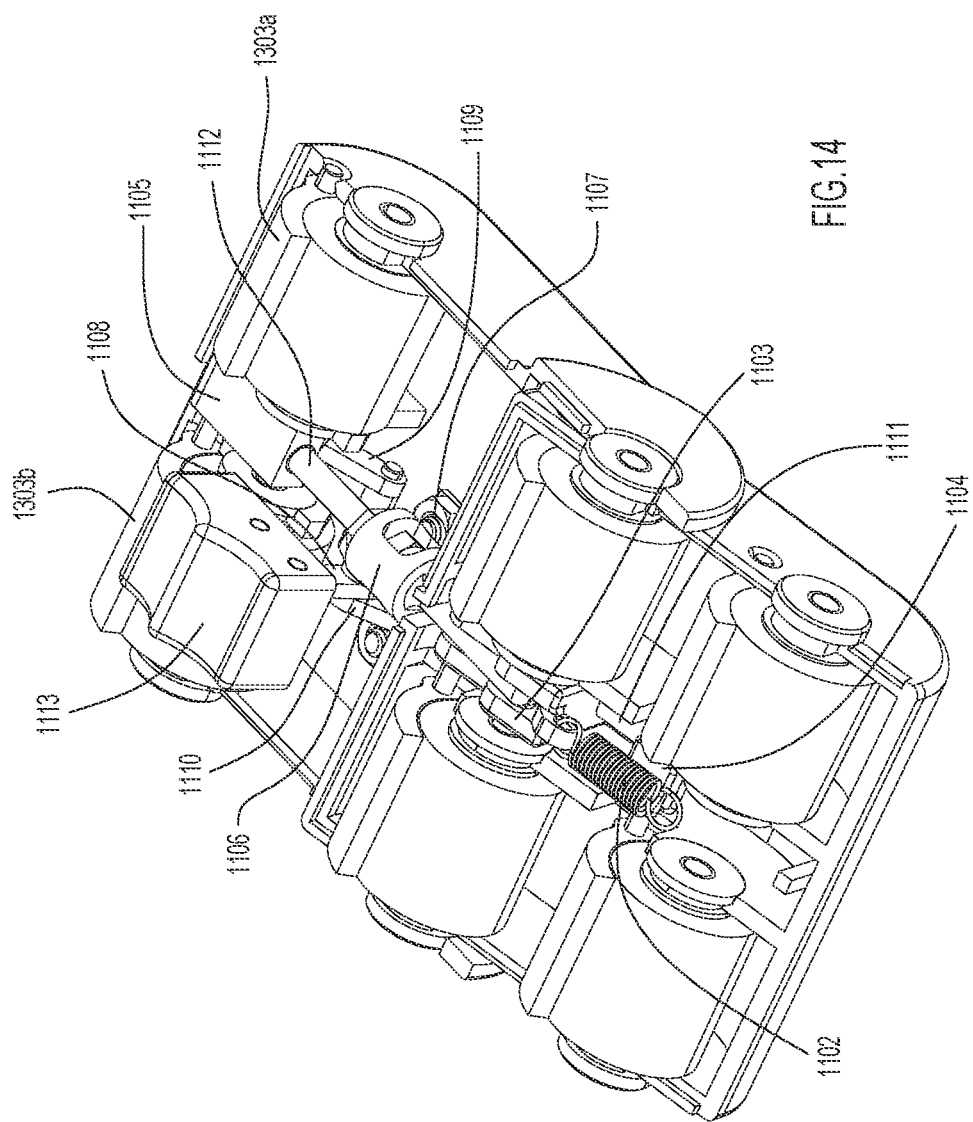
FIG. 14 illustrates a top down and side perspective view of the floating mechanical brake-based mechanism mounting assembly of FIGS. 9A, 9B, and 10, with the top shell removed to expose components of the mechanical brake-based mechanism.

FIG. 11 shows the tension module of the upper and lower portion. The tension module for the upper portion comprises tension components pin guide 1105, a portion of link arm joint 1106, anchor 1107, switch arm 1108, link arm 1109, slider linkage 1110, rod linkage 1112, knob 1113, and track 1114. Dowels (e.g., dowels 1115a-1115g) may be used to connect various tension components as shown in FIG. 14.

Upon translocation of knob 1113 forward from its resting position, force is transmitted through the system, via switch arm 1108 and connecting parts (e.g., slider linkage 1110, track 1114, link arm 1109), to pin guide 1105, which is translocated in the same direction as the knob. In doing so, brakes 1303a, 1303b of the upper portion and brakes 1203a-1203d of the lower portion are also translocated forward, via connections by dowels on the respective brakes, to reduce contact between the brakes and their corresponding rollers. In doing so, the rollers become free to rotate, thereby allowing positioning of the mounting assembly with three degrees of freedom. Connectivity of the assembled tension system is shown in FIGS. 10 and 14.

Still referring to FIG. 11, knob 1113 is connected to track 1114 (not visible in FIG. 10 or 14), which allows the knob to be translocated in a forward and backward manner with respect to upper top shell 1305. Switch arm 1108 connects to knob 1113 via track 1114 and slider linkage 1110. Dowels 1115d, 1115f, and 1115g secure the respective components relative to each other.

Extension 1120 of switch arm 1108 is also connected to a first opening 1125 of pin guide 1105 via link arm 1109. Pin guide 1105 is connected to upper brakes 1303a, 1303b via dowels using a second opening 1122. Rod linkage 1112 is connected to link arm joint 1106, with bolts, with the upper part of link arm joint 1106 residing in the upper portion and the rod-like portion residing in the lower portion. Link arm joint 1106 comprises components (the rod-like extension and the joint) that are movable relative to each other, facilitating movement of the upper portion relative to the lower portion. Similarly, dowels (e.g., 1115a, 1115b, 1115c) may be used to secure components with respect to each other. In some aspects, anchor 1107, which may be bolted to shell 1304, connects to switch arm 1108. For example, switch arm 1108 may be pinned to anchor 1107 at the locations marked with stars, as shown in FIG. 11.

The tension module for the lower portion comprises front linkage 1111/front pin guide 1104/bolt 1101, spring 1102, upper pin guide 1103 and a portion of link arm joint 1106. The rod-like extension from link arm joint 1106 may extend into the lower portion, positioned between grooves 1121a and 1121b of pin guide 1103, and connected to pin guide 1103 via dowel 1115e via pin guide opening 1121c.

With further reference to FIG. 11 (and FIGS. 10 and 14), screw 1101/front pin guide 1104/front linkage 1111 is connected to a first end of spring 1102 and to upper pin guide 1103. A second end of spring 1102 is also connected to upper pin guide 1103. Dashed lines show connectivity between components in FIG. 11.

Figure 12:
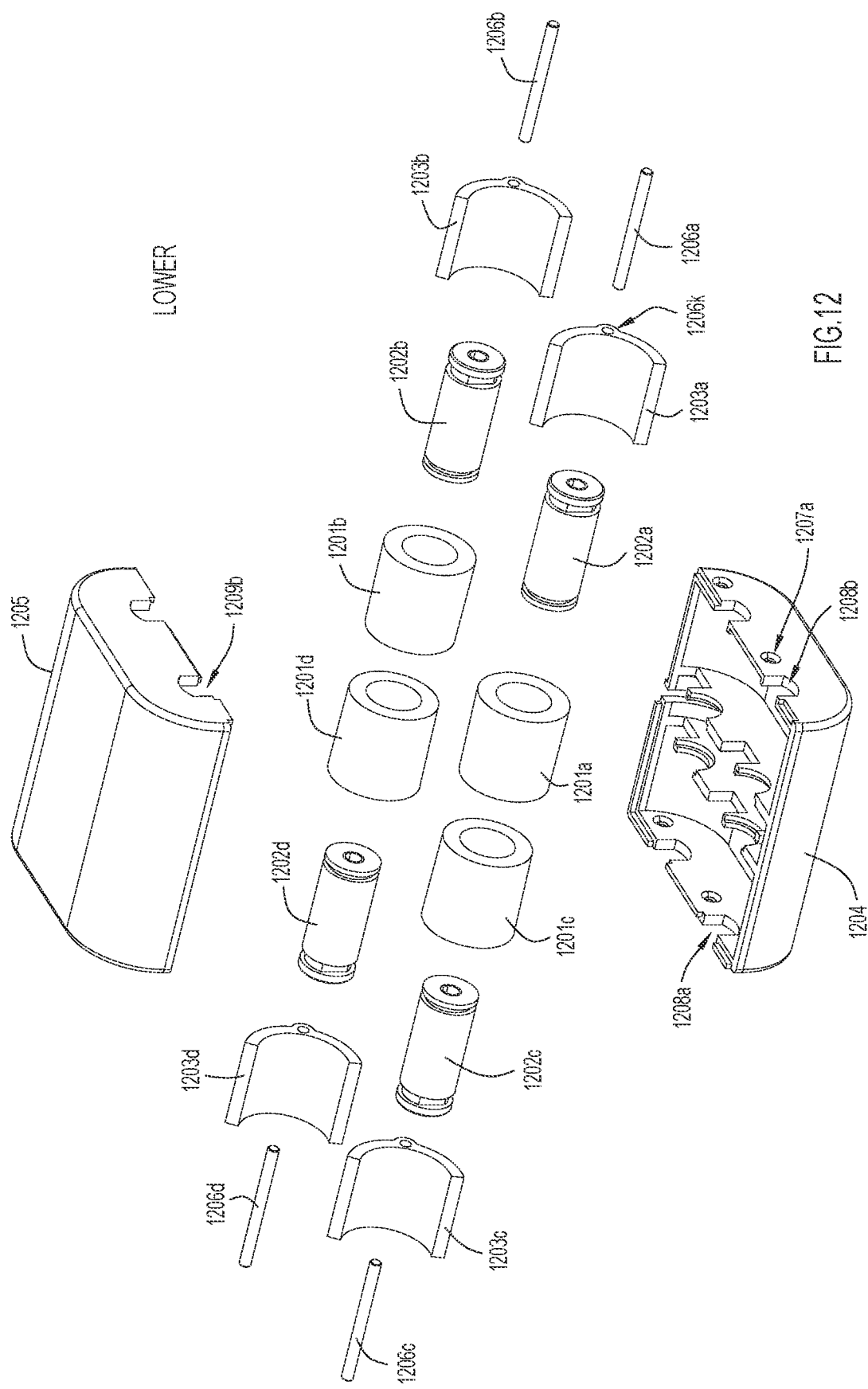
FIG. 12 illustrates an exploded perspective view of the rotatable module of the lower portion of the floating mechanical brake-based mechanism mounting assembly of FIGS. 9A, 9B and 10.

The upper and lower portions each comprise a rotatable module. With reference to FIG. 12, the rotatable module comprises the following components: rollers 1201a, 1201b, 1201c, 1201d; shafts 1202a, 1202b, 1202c and 1202d; brakes 1203a, 1203b, 1203c, and 1203d; lower top shell 1205, lower bottom shell 1204, and dowels 1206a, 1206b, 1206c and 1206d. Each crank is placed inside its respective roller (e.g., crank 1202a is placed inside roller 1201a, etc.), and each roller is in contact with its respective brake (e.g., roller 1201a is in contact with brake 1203a, etc.). Each brake is in contact with the outer surface of its respective roller to restrict rotation of the roller. A dowel connects the brake to the tension component and the lower portion, and in particular, to an opening 1207a in lower bottom shell 1204. The dowel extends through an opening 1206k in the respective brake, and connecting into a respective opening in the bottom shell 1207a as well as to the tension component. Each roller may sit atop a grooved configuration 1208a, 1208b, adapted for positioning the crank in the interior of the lower portion. When the top shell joins the bottom shell, the grooved configurations (e.g., 1208b, 1209b, etc.) form openings for the respective cranks.

Figure 13:
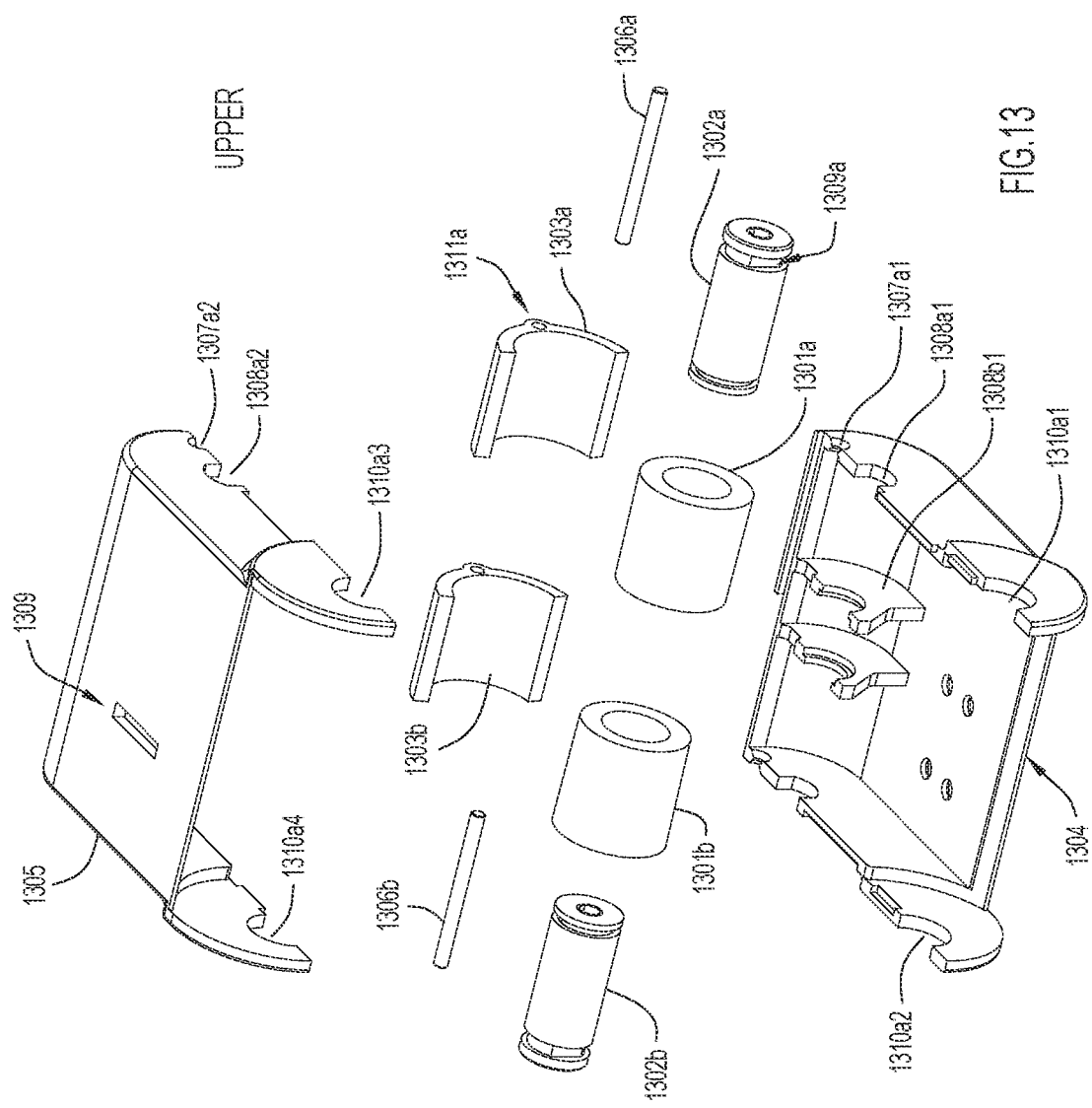
FIG. 13 illustrates an exploded perspective view of the rotatable module of the upper portion of the floating mechanical brake-based mounting mechanism assembly of FIGS. 9A, 9B and 10.

Referring to the expanded view of the upper portion as shown FIG. 13, the rotatable module comprises the following components: rollers 1301a and 1301b, shafts 1302a and 1302b, brakes 1303a and 1303b, upper top shell 1305, upper bottom shell 1304, dowels 1306a and 1306b. The roller portion may be assembled by placement of crank 1302a within the interior of roller 1301a. Brake 1303a may be located proximal to the outer surface of roller 1301a and secured with a dowel 1306a, wherein the dowel extends through an opening 1311a on the side of brake 1303a to connect to the tension component and to an opening on the shell formed by grooved configurations 1307a1, 1307a2, which form an opening upon connection of the upper top shell 1305 and upper bottom shell 1304. Ingressions at each end of the crank allows the crank to be positioned within the top and bottom shells. The crank is positioned within interior groove 1308b1 on the bottom shell and an interior groove within the upper shell (not shown) and an opening formed by exterior groove 1308a1 and 1308a2, adapted for positioning the crank/roller in the interior of the upper portion. Brake 1303a contacts the outer portion of roller 1301a to restrict rotation of the roller. The other roller may be situated in the upper portion in an analogous manner. Grooves (1310a1, 1310a2, 1310a3 and 13010a4) in the upper top shell 1305 and upper bottom shell 1304 form openings through which the rotatable junction is positioned upon connection of the upper shell and lower shell.

FIG. 14 illustrates a top down perspective view of the floating mechanical brake-based mechanism mounting assembly of FIGS. 10-13, with the top shell removed to expose components of the mechanical brake-based mechanism. Components are labeled to show connectivity.

To describe the operation of the mounting system with respect to the aforementioned components, when knob 1113 is translocated along track 1114 (not shown) via slot 1309, in a forward manner, force is exerted through switch arm 1108 to brakes 1303b and 1303a, via connecting dowels (noting that the dowels connect from brake 1303a through opening 1122 of pin guide 1105 to brake 1303b, and that switch arm 1108 translocates to exert force on pin guide 1105 via link arm 1109). The brakes are displaced forward, and tension is released on brakes 1303a and 1303b.

Pin guide 1105 is connected to link arm joint 1106 via rod linkage 1112, and the rod-like extension of link arm joint 1106 is connected to upper pin guide 1103. Thus, when pin guide 1105 moves forward, tension is also released on brakes 1203a and 1203c (noting that brakes 1203a and 1203c are connected to each other via a dowel inserted through a groove 1123 in front pin guide 1104) and on brakes 1203b and 1203d (noting that brakes 1203b and 1203d are connected to each other via another dowel, the dowel inserted into opening 1121a and 1121b on upper pin guide 1103). Thus, force from translocating the knob releases the tension on each of the brakes in the mounting assembly. When a desired position is reached, the user releases the knob, and counter force from spring 1102 brings each of the brakes back into contact with their respective rollers, thereby locking the position of the mounting assembly.

In some aspects, the mounting assembly may be compatible with standard interfaces. For example, the interface between the google and mounting assembly may be compatible with "hot-shoe" form factors. Further, the interface between the mounting assembly and the helmet may be compatible with a "quick release" bracket form factor. In some aspects, integration of the mounting assembly with the goggles or helmet may be semi-permanent. Many different configurations are contemplated herein, and all are considered to fall within the scope of present embodiments.

Moreover, it is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A mounting assembly for mounting a pair of goggles to a helmet, comprising:

a single actuating mechanism for locking and unlocking a position of the mounting assembly, wherein the single actuating mechanism comprises:
- a tension module including at least one spring configured to extend within the single actuation mechanism from the pair of goggles toward the helmet;
- a rotatable module comprising a plurality of knuckle and roller components configured to rotate perpendicular to the direction at which the at least one spring extends;
- at least one braking component coupled to the single actuating mechanism that, when actuated by the single actuating mechanism, the at least one braking component releases friction on the roller components to allow rotation of the roller components, to provide at least three degrees of freedom about each of the knuckle components.

2. The mounting assembly of claim 1, wherein the single actuation mechanism comprises a movable switch.

3. The mounting assembly of claim 1, wherein the plurality of knuckle components comprises three knuckle components, each of which correspond to one of each of three degrees of freedom.

4. The mounting assembly of claim 1, further comprising three sets of the plurality of knuckle and roller components frictionally engaged with corresponding three sets of the at least one braking component when the at least one spring is biased with a restoring force to the brakes.

5. The mounting assembly of claim 1, further comprising at least one wire, one of which is coupled at one end to the at least one spring, and wherein the at least one wire and the at least one spring extends between the pair of goggles and the helmet.

6. The mounting assembly of claim 1, wherein the single actuation mechanism comprises:
- a movable switch;
- a switch arm coupled to the moveable switch;
- a pin guide slideably coupled to the at least one braking component, wherein, upon receiving movement force on the moveable switch, force is applied to a pin guide to move the at least one braking component from the roller components.

7. The mounting assembly of claim 1, wherein the at least three degrees of movement comprises three degrees of movement, and for each degree of freedom of movement a set knuckle and roller components are joined to form an axis of rotation.

8. The mounting assembly of claim 7, further comprising three sets of knuckle and roller components, each set of which rotate around an axis of rotation and wherein each axis of rotation is parallel to the other axes of rotation.

9. The mounting assembly of claim 1, further comprises a helmet base coupled between the helmet and the single actuating mechanism.

10. The mounting assembly of claim 9, further comprising a goggle linkage coupled between the pair of goggles and the single actuating mechanism.

11. The mounting assembly of claim 10, wherein the at least one spring extends from the goggle linkage toward the helmet base.

12. The mounting assembly of claim 11, further comprising at least one wire, wherein one end of one of the at least one wire is coupled to one end of the at least one spring.

13. The mounting assembly of claim 12, wherein the at least one wire comprises two wires, wherein one of the two wires extends between the spring and a first set of the plurality of knuckle and roller components, and wherein the other of the two wires extends between the first set of the plurality of knuckle and roller components and a second set of the plurality of knuckle and roller components.

14. The mounting assembly of claim 8, wherein the at least one braking component comprises three sets of braking components.

15. The mounting assembly of claim 14, wherein each of the three sets of braking components frictionally engage with corresponding each of the three sets of roller components when the spring is biased in an extended direction.

16. The mounting assembly of claim 15, wherein each of the three sets of braking components frictionally disengage with corresponding each of the three sets of roller components when the single actuating mechanism is not actuated to release the spring from its extended direction.

17. The mounting assembly of claim 1, wherein the mounting assembly is part of a night vision device, and wherein the mounting assembly allows positioning of the pair of goggles relative to a user.

18. The mounting assembly of claim 17, wherein the moveable switch, when actuated by force applied by the user, releases the pair of goggles from the helmet in three degrees of freedom of movement.

* * * * *